(12) United States Patent
Kim et al.

(10) Patent No.: US 12,147,244 B2
(45) Date of Patent: Nov. 19, 2024

(54) AUTONOMOUS ROBOTIC NAVIGATION IN STORAGE SITE

(71) Applicant: Brookhurst Garage, Inc., San Jose, CA (US)

(72) Inventors: Young Joon Kim, San Jose, CA (US); Kyuman Lee, Buk-gu (KR); Sunyou Hwang, Seoul (KR)

(73) Assignee: Brookhurst Garage, Inc., San Jose, CA (US)

( * ) Notice: Subject to any disclaimer, the term of this patent is extended or adjusted under 35 U.S.C. 154(b) by 6 days.

(21) Appl. No.: 18/196,101

(22) Filed: May 11, 2023

(65) Prior Publication Data
US 2023/0280759 A1  Sep. 7, 2023

Related U.S. Application Data

(63) Continuation of application No. 16/925,241, filed on Jul. 9, 2020, now Pat. No. 11,687,086.

(51) Int. Cl.
*G05D 1/00* (2024.01)
*B64C 39/02* (2023.01)
(Continued)

(52) U.S. Cl.
CPC ......... *G05D 1/0253* (2013.01); *B64C 39/024* (2013.01); *G06N 3/08* (2013.01);
(Continued)

(58) Field of Classification Search
None
See application file for complete search history.

(56) References Cited

U.S. PATENT DOCUMENTS

2009/0106037 A1\*  4/2009  Harindranath ......... G06Q 50/10
                                                                705/342
2009/0234815 A1   9/2009  Boerries et al.
(Continued)

FOREIGN PATENT DOCUMENTS

KR  10-2019-0094303 A   8/2019
KR  10-2020-0027087 A   3/2020
WO  WO 2018/035482 A1   2/2018

OTHER PUBLICATIONS

Schwesinger D, Spletzer J. A 3D approach to infrastructure-free localization in large scale warehouse environments. In2016 IEEE International Conference on Automation Science and Engineering (CASE) Aug. 21, 2016 (pp. 274-279). IEEE. (Year: 2016).\*
(Continued)

*Primary Examiner* — Clifford Hilaire
(74) *Attorney, Agent, or Firm* — Fenwick & West LLP

(57) ABSTRACT

A robot includes an image sensor that captures the environment of a storage site. The robot visually recognizes regularly shaped structures to navigate through the storage site using various object detection and image segmentation techniques. In response to receiving a target location in the storage site, the robot moves to the target location along a path. The robot receives the images as the robot moves along the path. The robot analyzes the images captured by the image sensor to determine the current location of the robot in the path by tracking a number of regularly shaped structures in the storage site passed by the robot. The regularly shaped structures may be racks, horizontal bars of the racks, and vertical bars of the racks. The robot can identify the target location by counting the number of rows and columns that the robot has passed.

20 Claims, 10 Drawing Sheets

(51) Int. Cl.
*B64U 50/34* (2023.01)
*B64U 101/30* (2023.01)
*G06N 3/08* (2023.01)
*G06T 7/12* (2017.01)
*G06T 7/73* (2017.01)

(52) U.S. Cl.
CPC ............... *G06T 7/12* (2017.01); *G06T 7/74* (2017.01); *B64U 50/34* (2023.01); *B64U 2101/30* (2023.01); *G06T 2207/10028* (2013.01); *G06T 2207/30242* (2013.01)

(56) References Cited

U.S. PATENT DOCUMENTS

| | | |
|---|---|---|
| 2012/0323365 A1 | 12/2012 | Taylor et al. |
| 2014/0336928 A1 | 11/2014 | Scott |
| 2015/0032252 A1 | 1/2015 | Galluzzo et al. |
| 2016/0124434 A1 | 5/2016 | Gariepy et al. |
| 2018/0150713 A1 | 5/2018 | Farooqi et al. |
| 2018/0150970 A1 | 5/2018 | Benini et al. |
| 2018/0253108 A1 | 9/2018 | Heinla et al. |
| 2018/0370046 A1 | 12/2018 | Hance et al. |
| 2019/0307106 A1 | 10/2019 | Hartung et al. |
| 2020/0039427 A1 | 2/2020 | Chen et al. |
| 2020/0125830 A1 | 4/2020 | Lei et al. |

OTHER PUBLICATIONS

PCT International Search Report and Written Opinion, PCT Application No. PCT/US2021/039357, Oct. 14, 2021, 11 pages.

United States Office Action, U.S. Appl. No. 16/925,241, Sep. 13, 2022, 20 pages.

European Patent Office, Extended European Search Report and Written Opinion, European Patent Application No. 21838792.6, May 29, 2024, 8 pages.

Kosnar, K. et al. "Localization of Humans in Warehouse Based on Rack Detection," *European Conference on Mobile Robots*, Sep. 4, 2019, 6 pages.

* cited by examiner

AUTONOMOUS ROBOTIC NAVIGATION IN STORAGE SITE

CROSS-REFERENCE TO RELATED APPLICATION

This application is a continuation of U.S. Non-Provisional application Ser. No. 16/925,241, filed Jul. 9, 2020, which is herein incorporated by reference in its entirety.

TECHNICAL FIELD

The disclosure generally relates to robots used in a storage site and, more specifically, to robots that navigate through a storage site autonomously.

BACKGROUND

Inventory management in a storage site such as a warehouse can be a complex and labor-intensive process. Inventory items are usually placed at their designated locations with barcodes of the items readily scannable to quickly locate the items. However, in some cases, items can be misplaced and become difficult to be found. Also, misplaced items may occupy space that is reserved for incoming inventory, causing storage site personnel to spend time relocating items and tracking missing items.

SUMMARY

Embodiments relate to a robot that includes an image sensor for capturing images of a storage site and one or more processors for executing various sets of instructions. The robot receives a target location in the storage site. The robot moves from the base station to the target location along a path. The robot receives the images captured by the image sensor as the robot moves along the path. The robot analyzes the images captured by the image sensor to determine the current location of the robot in the path by tracking the number of regularly shaped structures in the storage site passed by the robot. The regularly shaped structures may be racks, horizontal bars of the racks, and vertical bars of the racks. The robot can identify the target location by counting the number of rows and columns that the robot has passed.

Figure 1:
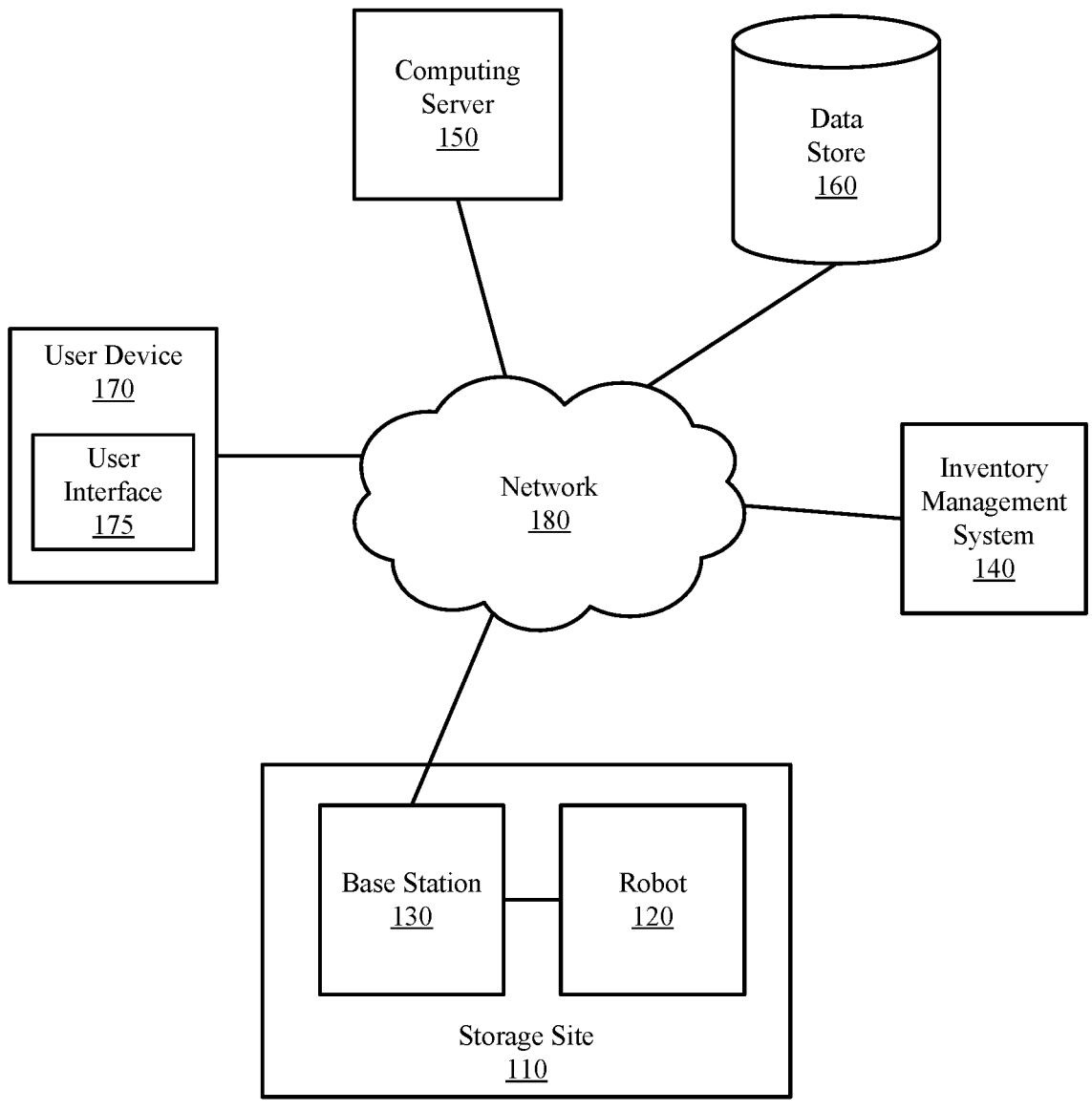
FIG. 1 is a block diagram that illustrates a system environment of an example storage site, according to an embodiment.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to a robot that navigates through a storage site by visually recognizing objects in the environment, including racks and rows and columns of the racks, and counting the number of objects that the robot has passed. The robot may use an image sensor to continuously capture the environment of the storage site. The images are analyzed by image segmentation techniques to identify the outline of the readily identifiable objects such as racks and their rows and columns. By counting the number of racks that the robot has passed, the robot can identify an aisle at which a target location is located. The robot can also count the number of rows and columns to identify the target location of the rack.

System Overview

FIG. (Figure) 1 is a block diagram that illustrates a system environment 100 of an example robotically-assisted or fully autonomous storage site, according to an embodiment. By way of example, the system environment 100 includes a storage site 110, a robot 120, a base station 130, an inventory management system 140, a computing server 150, a data store 160, and a user device 170. The entities and components in the system environment 100 communicate with each other through the network 180. In various embodiments, the system environment 100 may include different, fewer, or additional components. Also, while each of the components in the system environment 100 is described in a singular form, the system environment 100 may include one or more of each of the components. For example, the storage site 110 may include one or more robots 120 and one or more base stations 130. Each robot 120 may have a corresponding base station 130 or multiple robots 120 may share a base station 130.

A storage site 110 may be any suitable facility that stores, sells, or displays inventories such as goods, merchandise, groceries, articles and collections. Example storage sites 110 may include warehouses, inventory sites, bookstores, shoe stores, outlets, other retail stores, libraries, museums, etc. A storage site 110 may include a number of regularly shaped structures. Regularly shaped structures may be structures, fixtures, equipment, furniture, frames, shells, racks, or other suitable things in the storage site 110 that have a regular shape or outline that can be readily identifiable, whether the things are permanent or temporary, fixed or movable, weight-bearing or not. The regularly shaped structures are often used in a storage site 110 for storage of inventory. For example, racks (including metallic racks, shells, frames, or other similar structures) are often used in a warehouse for the storage of goods and merchandise. However, not all regularly shaped structures may need to be used for inventory storage. A storage site 110 may include a certain layout that allows various items to be placed and stored systematically. For example, in a warehouse, the racks may be grouped by sections and separated by aisles. Each rack may include multiple pallet locations that can be identified using a row number and a column number. A storage site may include high racks and low racks, which may, in some case, largely carry most of the inventory items near the ground level.

A storage site 110 may include one or more robots 120 that are used to keep track of the inventory and to manage the inventory in the storage site 110. For the ease of reference, the robot 120 may be referred to in a singular form, even though more than one robot 120 may be used. Also, in some embodiments, there can be more than one type of robot 120 in a storage site 110. For example, some robots 120 may specialize in scanning inventory in the storage site 110, while other robots 120 may specialize in moving items. A robot 120 may also be referred to as an autonomous robot, an inventory cycle-counting robot, an inventory survey robot, an inventory detection robot, or an inventory management robot. An inventory robot may be used to track inventory items, move inventory items, and carry out other inventory management tasks. The degree of autonomy may vary from embodiments to embodiments. For example, in one embodiment, the robot 120 may be fully autonomous so that the robot 120 automatically performs assigned tasks. In another embodiment, the robot 120 may be semi-autonomous such that it can navigate through the storage site 110 with minimal human commands or controls. In some embodiments, no matter what the degree of autonomy it has, a robot 120 may also be controlled remotely and may be switched to a manual mode. The robot 120 may take various forms such as an aerial drone, a ground robot, a vehicle, a forklift, and a mobile picking robot.

A base station 130 may be a device for the robot 120 to return and, for an aerial robot, to land. The base station 130 may include more than one return site. The base station 130 may be used to repower the robot 120. Various ways to repower the robot 120 may be used in different embodiments. For example, in one embodiment, the base station 130 serves as a battery-swapping station that exchanges batteries on a robot 120 as the robot arrives at the base station to allow the robot 120 to quickly resume duty. The replaced batteries may be charged at the base station 130, wired or wirelessly. In another embodiment, the base station 130 serves as a charging station that has one or more charging terminals to be coupled to the charging terminal of the robot 120 to recharge the batteries of the robot 120. In yet another embodiment, the robot 120 may use fuel for power and the base station 130 may repower the robot 120 by filling its fuel tank.

The base station 130 may also serve as a communication station for the robot 120. For example, for certain types of storage sites 110 such as warehouses, network coverage may not be present or may only be present at certain locations. The base station 130 may communicate with other components in the system environment 100 using wireless or wired communication channels such as Wi-Fi or an Ethernet cable. The robot 120 may communicate with the base station 130 when the robot 120 returns to the base station 130. The base station 130 may send inputs such as commands to the robot 120 and download data captured by the robot 120. In embodiments where multiple robots 120 are used, the base station 130 may be equipped with a swarm control unit or algorithm to coordinate the movements among the robots. The base station 130 and the robot 120 may communicate in any suitable ways such as radio frequency, Bluetooth, near-field communication (NFC), or wired communication. While, in one embodiment, the robot 120 mainly communicates to the base station, in other embodiments the robot 120 may also have the capability to directly communicate with other components in the system environment 100. In one embodiment, the base station 130 may serve as a wireless signal amplifier for the robot 120 to directly communicate with the network 180.

The inventory management system 140 may be a computing system that is operated by the administrator (e.g., a company that owns the inventory, a warehouse management administrator, a retailer selling the inventory) using the storage site 110. The inventory management system 140 may be a system used to manage the inventory items. The inventory management system 140 may include a database that stores data regarding inventory items and the items' associated information, such as quantities in the storage site 110, metadata tags, asset type tags, barcode labels and location coordinates of the items. The inventory management system 140 may provide both front-end and back-end software for the administrator to access a central database and point of reference for the inventory and to analyze data, generate reports, forecast future demands, and manage the locations of the inventory items to ensure items are correctly placed. An administrator may rely on the item coordinate data in the inventory management system 140 to ensure that items are correctly placed in the storage site 110 so that the items can be readily retrieved from a storage location. This prevents an incorrectly placed item from occupying a space that is reserved for an incoming item and also reduces time to locate a missing item at an outbound process.

The computing server 150 may be a server that is tasked with analyzing data provided by the robot 120 and provide commands for the robot 120 to perform various inventory recognition and management tasks. The robot 120 may be controlled by the computing server 150, the user device 170, or the inventory management system 140. For example, the computing server 150 may direct the robot 120 to scan and capture pictures of inventory stored at various locations at the storage site 110. Based on the data provided by the inventory management system 140 and the ground truth data captured by the robot 120, the computing server 150 may identify discrepancies in two sets of data and determine whether any items may be misplaced, lost, damaged, or otherwise should be flagged for various reasons. In turn, the computing server 150 may direct a robot 120 to remedy any potential issues such as moving a misplaced item to the correct position. In one embodiment, the computing server 150 may also generate a report of flagged items to allow site personnel to manually correct the issues.

The computing server 150 may include one or more computing devices that operate at different locations. For example, a part of the computing server 150 may be a local server that is located at the storage site 110. The computing hardware such as the processor may be associated with a computer on site or may be included in the base station 130.

Another part of the computing server 150 may be a cloud server that is geographically distributed. The computing server 150 may serve as a ground control station (GCS), provide data processing, and maintain end-user software that may be used in a user device 170. A GCS may be responsible for the control, monitor and maintenance of the robot 120. In one embodiment, GCS is located on-site as part of the base station 130. The data processing pipeline and end-user software server may be located remotely or on-site.

The computing server 150 may maintain software applications for users to manage the inventory, the base station 130, and the robot 120. The computing server 150 and the inventory management system 140 may or may not be operated by the same entity. In one embodiment, the computing server 150 may be operated by an entity separated from the administrator of the storage site. For example, the computing server 150 may be operated by a robotic service provider that supplies the robot 120 and related systems to modernize and automate a storage site 110. The software application provided by the computing server 150 may take several forms. In one embodiment, the software application may be integrated with or as an add-on to the inventory management system 140. In another embodiment, the software application may be a separate application that supplements or replaces the inventory management system 140. In one embodiment, the software application may be provided as software as a service (SaaS) to the administrator of the storage site 110 by the robotic service provider that supplies the robot 120.

The data store 160 includes one or more storage units such as memory that takes the form of non-transitory and non-volatile computer storage medium to store various data that may be uploaded by the robot 120 and inventory management system 140. For example, the data stored in data store 160 may include pictures, sensor data, and other data captured by the robot 120. The data may also include inventory data that is maintained by the inventory management system 140. The computer-readable storage medium is a medium that does not include a transitory medium such as a propagating signal or a carrier wave. The data store 160 may take various forms. In one embodiment, the data store 160 communicates with other components by the network 180. This type of data store 160 may be referred to as a cloud storage server. Example cloud storage service providers may include AWS, AZURE STORAGE, GOOGLE CLOUD STORAGE, etc. In another embodiment, instead of a cloud storage server, the data store 160 is a storage device that is controlled and connected to the computing server 150. For example, the data store 160 may take the form of memory (e.g., hard drives, flash memories, discs, ROMs, etc.) used by the computing server 150 such as storage devices in a storage server room that is operated by the computing server 150.

The user device 170 may be used by an administrator of the storage site 110 to provide commands to the robot 120 and to manage the inventory in the storage site 110. For example, using the user device 170, the administrator can provide task commands to the robot 120 for the robot to automatically complete the tasks. In one case, the administrator can specify a specific target location or a range of storage locations for the robot 120 to scan. The administrator may also specify a specific item for the robot 120 to locate or to confirm placement. Examples of user devices 170 include personal computers (PCs), desktop computers, laptop computers, tablet computers, smartphones, wearable electronic devices such as smartwatches, or any other suitable electronic devices.

The user device 170 may include a user interface 175, which may take the form of a graphical user interface (GUI). Software application provided by the computing server 150 or the inventory management system 140 may be displayed as the user interface 175. The user interface 175 may take different forms. In one embodiment, the user interface 175 is part of a front-end software application that includes a GUI displayed at the user device 170. In one case, the front-end software application is a software application that can be downloaded and installed at user devices 170 via, for example, an application store (e.g., App Store) of the user device 170. In another case, the user interface 175 takes the form of a Web interface of the computing server 150 or the inventory management system 140 that allows clients to perform actions through web browsers. In another embodiment, user interface 175 does not include graphical elements but communicates with the computing server 150 or the inventory management system 140 via other suitable ways such as command windows or application program interfaces (APIs).

The communications among the robot 120, the base station 130, the inventory management system 140, the computing server 150, the data store 160, and the user device 170 may be transmitted via a network 180, for example, via the Internet. In one embodiment, the network 180 uses standard communication technologies and/or protocols. Thus, the network 180 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express, etc. Similarly, the networking protocols used on the network 180 can include multiprotocol label switching (MPLS), the transmission control protocol/Internet protocol (TCP/IP), the user datagram protocol (UDP), the hypertext transport protocol (HTTP), the simple mail transfer protocol (SMTP), the file transfer protocol (FTP), etc. The data exchanged over the network 180 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet protocol security (IPsec), etc. The network 180 also includes links and packet switching networks such as the Internet. In some embodiments, two computing servers, such as computing server 150 and inventory management system 140, may communicate through APIs. For example, the computing server 150 may retrieve inventory data from the inventory management system 140 via an API.

Example Robot and Base Station

Figure 2:
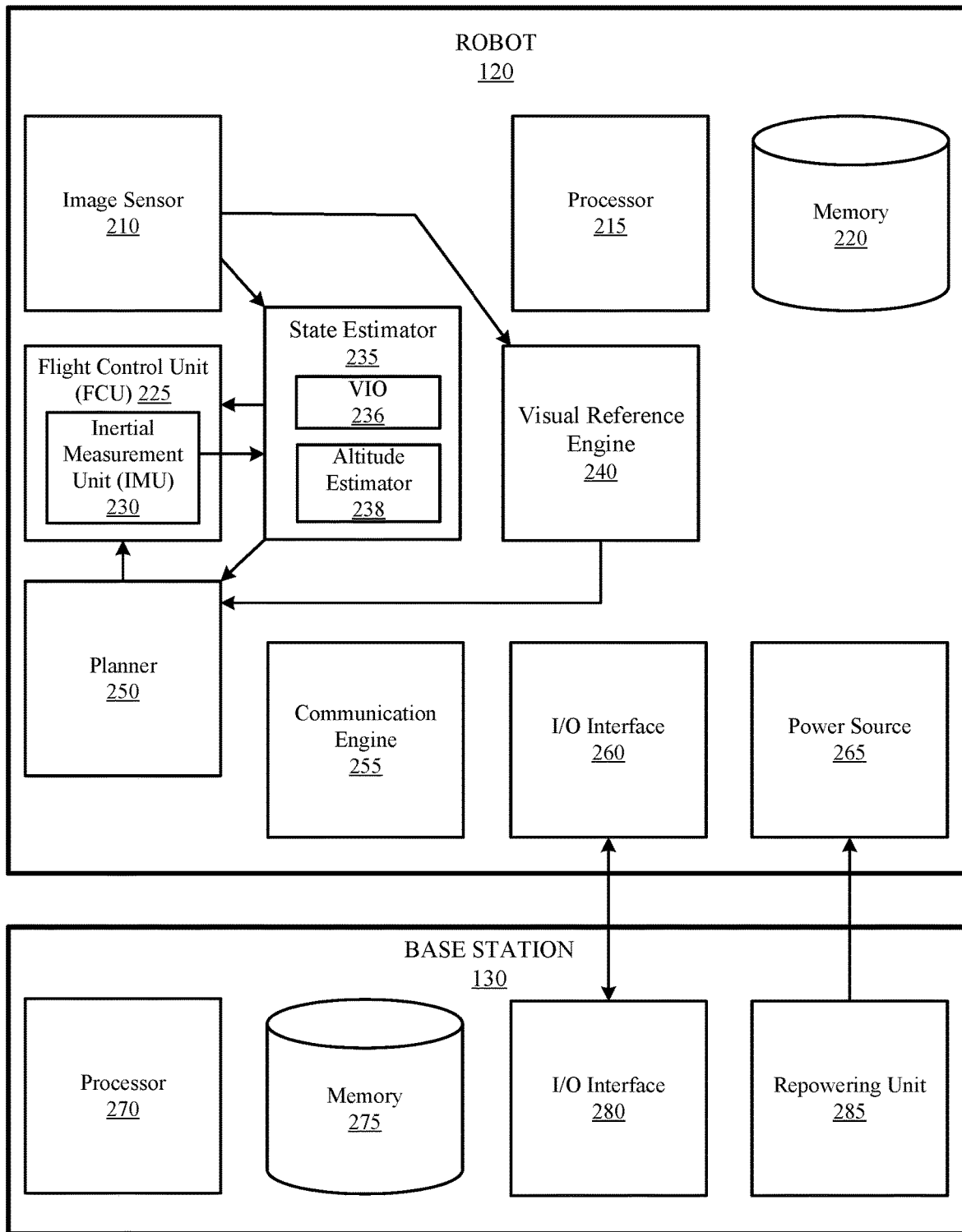
FIG. 2 is a block diagram that illustrates components of an example robot and an example base station, according to an embodiment.

FIG. 2 is a block diagram illustrating components of an example robot 120 and an example base station 130, according to an embodiment. The robot 120 may include an image sensor 210, a processor 215, memory 220, a flight control unit (FCU) 225 that includes an inertia measurement unit (IMU) 230, a state estimator 235, a visual reference engine 240, a planner 250, a communication engine 255, an I/O interface 260, and a power source 265. The functions of the robot 120 may be distributed among various components in a different manner than described below. In various embodiments, the robot 120 may include different, fewer, and/or additional components. Also, while each of the components in FIG. 2 is described in a singular form, the components may present in plurality. For example, a robot 120 may include more than one image sensor 210 and more than one processor 215.

The image sensor 210 captures images of an environment of a storage site for navigation, localization, collision avoidance, object recognition and identification, and inventory recognition purposes. A robot 120 may include more than one image sensors 210 and more than one type of such image sensors 210. For example, the robot 120 may include a digital camera that captures optical images of the environment for the state estimator 235. For example, data captured by the image sensor 210 may also be provided to the VIO unit 236 that may be included in the state estimator 235 for localization purposes such as to determine the position and orientation of the robot 120 with respect to an inertial frame, such as a global frame whose location is known and fixed. The robot 120 may also include a stereo camera that includes two or more lenses to allow the image sensor 210 to capture three-dimensional images through stereoscopic photography. For each image frame, the stereo camera may generate pixel values such as in red, green, and blue (RGB) and point cloud data that includes depth information. The images captured by the stereo camera may be provided to visual reference engine 240 for object recognition purposes. The image sensor 210 may also be another type of image sensor such as a light detection and ranging (LIDAR) sensor, an infrared camera, and 360-degree depth cameras. The image sensor 210 may also capture pictures of labels (e.g., barcodes) on items for inventory cycle-counting purposes. In some embodiments, a single stereo camera may be used for various purposes. For example, the stereo camera may provide image data to the visual reference engine 240 for object recognition. The stereo camera may also be used to capture pictures of labels (e.g., barcodes). In some embodiments, the robot 120 includes a rotational mount such as a gimbal that allows the image sensor 210 to rotate in different angles and to stabilize images captured by the image sensor 210. In one embodiment, the image sensor 210 may also capture data along the path for the purpose of mapping the storage site.

The robot 120 includes one or more processors 215 and one or more memories 220 that store one or more sets of instructions. The one or more sets of instructions, when executed by one or more processors, cause the one or more processors to carry out processes that are implemented as one or more software engines. Various components, such as FCU 225 and state estimator 235, of the robot 120 may be implemented as a combination of software and hardware (e.g., sensors). The robot 120 may use a single general processor to execute various software engines or may use separate more specialized processors for different functionalities. In one embodiment, the robot 120 may use a general-purpose computer (e.g., a CPU) that can execute various instruction sets for various components (e.g., FCU 225, visual reference engine 240, state estimator 235, planner 250). The general-purpose computer may run on a suitable operating system such as LINUX, ANDROID, etc. For example, in one embodiment, the robot 120 may carry a smartphone that includes an application used to control the robot. In another embodiment, the robot 120 includes multiple processors that are specialized in different functionalities. For example, some of the functional components such as FCU 225, visual reference engine 240, state estimator 235, and planner 250 may be modularized and each includes its own processor, memory, and a set of instructions. The robot 120 may include a central processor unit (CPU) to coordinate and communicate with each modularized component. Hence, depending on embodiments, a robot 120 may include a single processor or multiple processors 215 to carry out various operations. The memory 220 may also store images and videos captured by the image sensor 210. The images may include images that capture the surrounding environment and images of the inventory such as barcodes and labels.

The flight control unit (FCU) 225 may be a combination of software and hardware, such as inertial measurement unit (IMU) 230 and other sensors, to control the movement of the robot 120. For ground robot 120, the flight control unit 225 may also be referred to as a microcontroller unit (MCU). The FCU 225 relies on information provided by other components to control the movement of the robot 120. For example, the planner 250 determines the path of the robot 120 from a starting point to a destination and provides commands to the FCU 225. Based on the commands, the FCU 225 generates electrical signals to various mechanical parts (e.g., actuators, motors, engines, wheels) of the robot 120 to adjust the movement of the robot 120. The precise mechanical parts of the robots 120 may depend on the embodiments and the types of robots 120.

The IMU 230 may be part of the FCU 225 or may be an independent component. The IMU 230 may include one or more accelerometers, gyroscopes, and other suitable sensors to generate measurements of forces, linear accelerations, and rotations of the robot 120. For example, the accelerometers measure the force exerted on the robot 120 and detect the linear acceleration. Multiple accelerometers cooperate to detect the acceleration of the robot 120 in the three-dimensional space. For instance, a first accelerometer detects the acceleration in the x-direction, a second accelerometer detects the acceleration in the y-direction, and a third accelerometer detects the acceleration in the z-direction. The gyroscopes detect the rotations and angular acceleration of the robot 120. Based on the measurements, a processor 215 may obtain the estimated localization of the robot 120 by integrating the translation and rotation data of the IMU 230 with respect to time.

The state estimator 235 may correspond to a set of software instructions stored in the memory 220 that can be executed by the processor 215. The state estimator 235 may be used to generate localization information of the robot 120 and may include various sub-components for estimating the state of the robot 120. For example, in one embodiment, the state estimator 235 may include a visual-inertial odometry (VIO) unit 236 and an attitude estimator 238. In other embodiments, other modules, sensors, and algorithms may also be used in the state estimator 238 to determine the location of the robot 120.

The VIO unit 236 receives image data from the image sensor 210 (e.g., a stereo camera) and measurements from IMU 230 to generate localization information such as the position and orientation of the robot 120. The localization data obtained from the double integration of the acceleration measurements from the IMU 230 is often prone to drift errors. The VIO unit 236 may extract image feature points and tracks the feature points in the image sequence to generate optical flow vectors that represent the movement of edges, boundaries, surfaces of objects in the environment captured by the image sensor 210. Various signal processing techniques such as filtering (e.g., Wiener filter, Kalman filter, bandpass filter, particle filter) and optimization, and data/image transformation may be used to reduce various errors in determining localization information.

The altitude estimator 238 may be a combination of software and hardware that are used to determine the absolute altitude and relative altitude (e.g., distance from an object that lies on the floor) of the robot 120. The altitude estimator 238 may include a downward range finder that may measure the altitude relative to the ground to an object underneath the robot 120. A range finder may include IR (or any suitable signals) emitters and sensors that detect the round trip time of the IR reflected by an object. The altitude estimator 238 may also receive data from the VIO unit 236 that may estimate the absolute altitude of the robot 120, but usually in a less accurate fashion compared to a range finder. The altitude estimator 238 may include software algorithms to combine data generated by the range finder and the data generated by the VIO unit 236 as the robot 120 flies over various objects and inventory that are placed on the floor or other horizontal levels. The data generated by the altitude estimator 238 may be used for collision avoidance and finding a target location. The altitude estimator 238 may set a global maximum altitude to prevent the robot 120 from hitting the ceiling. The altitude estimator 238 also provides information regarding how many rows in the rack are below the robot 120 for the robot 120 to locate a target location. The altitude data may be used in conjunction with the count of rows that the robot 120 has passed to determine the vertical level of the robot 120.

The visual reference engine 240 may correspond to a set of software instructions stored in the memory 220 that can be executed by the processor 215. The visual reference engine 240 may include various image processing algorithm and location algorithm to determine the current location of the robot 120, to identify the objects, edges, and surfaces of the environment near the robot 120, and to determine an estimated distance and orientation (e.g., yaw) of the robot 120 relative to a nearby surface of an object. The visual reference engine 240 may receive pixel data of a series of images and point cloud data from the image sensor 210. The location information generated by the visual reference engine 240 may include distance and yaw from an object and center offset from a target point (e.g., a midpoint of a target object).

The visual reference engine 240 may include one or more algorithms and machine learning models to create image segmentations from the images captured by the image sensor 210. The image segmentation may include one or more segments that separate the frames (e.g., vertical or horizontal bars of racks) or outlines of regularly shaped structures appearing in the captured images from other objects and environments. The algorithms used for image segmentation may include a convolutional neural network (CNN). In performing the segmentation, other image segmentation algorithms such as edge detection algorithms (e.g., Canny operator, Laplacian operator, Sobel operator, Prewitt operator), corner detection algorithms, Hough transform, and other suitable feature detection algorithms may also be used.

The visual reference engine 240 also performs object recognition (e.g., object detection and further analyses) and keeps track of the relative movements of the objects across a series of images. The visual reference engine 240 may track the number of regularly shaped structures in the storage site 110 that are passed by the robot 120. For example, the visual reference engine 240 may identify a reference point (e.g., centroid) of a frame of a rack and determine if the reference point passes a certain location of the images across a series of images (e.g., whether the reference point passes the center of the images). If so, the visual reference engine 240 increments the number of regularly shaped structures that have been passed by the robot 120.

The robot 120 may use various components to generate various types of location information (including location information relative to nearby objects and localization information). For example, in one embodiment, the state estimator 235 may process the data from the VIO unit 236 and the altitude estimator 238 to provide localization information to the planner 250. The visual reference engine 240 may count the number of regularly shaped structures that the robot 120 has passed to determine a current location. The visual reference engine 240 may generate location information relative to nearby objects. For example, when the robot 120 reaches a target location of a rack, the visual reference engine 240 may use point cloud data to reconstruct a surface of the rack and use the depth data from the point cloud to determine more accurate yaw and distance between the robot 120 and the rack. The visual reference engine 240 may determine a center offset, which may correspond to the distance between the robot 120 and the center of a target location (e.g., the midpoint of a target location of a rack). Using the center offset information, the planner 250 controls the robot 120 to move to the target location and take a picture of the inventory in the target location. When the robot 120 changes direction (e.g., rotations, transitions from horizontal movement to vertical movement, transitions from vertical movement to horizontal movement, etc.), the center offset information may be used to determine the accurate location of the robot 120 relative to an object.

The planner 250 may correspond to a set of software instructions stored in the memory 220 that can be executed by the processor 215. The planner 250 may include various routing algorithms to plan a path of the robot 120 as the robot travels from a first location (e.g., a starting location, the current location of the robot 120 after finishing the previous journey) to a second location (e.g., a target destination). The robot 120 may receive inputs such as user commands to perform certain actions (e.g., scanning of inventory, moving an item, etc.) at certain locations. The planner 250 may include two types of routes, which corresponds to a spot check and a range scan. In a spot check, the planner 250 may receive an input that includes coordinates of one or more specific target locations. In response, the planner 250 plans a path for the robot 120 to travel to the target locations to perform an action. In a range scan, the input may include a range of coordinates corresponding to a range of target locations. In response, the planner 250 plans a path for the robot 120 to perform a full scan or actions for the range of target locations.

The planner 250 may plan the route of the robot 120 based on data provided by the visual reference engine 240 and the data provided by the state estimator 235. For example, the visual reference engine 240 estimates the current location of the robot 120 by tracking the number of regularly shaped structures in the storage site 110 passed by the robot 120. Based on the location information provided by the visual reference engine 240, the planner 250 determines the route of the robot 120 and may adjust the movement of the robot 120 as the robot 120 travels along the route.

The planner 250 may also include a fail-safe mechanism in the case where the movement of the robot 120 has deviated from the plan. For example, if the planner 250 determines that the robot 120 has passed a target aisle and traveled too far away from the target aisle, the planner 250 may send signals to the FCU 225 to try to remedy the path. If the error is not remedied after a timeout or within a reasonable distance, or the planner 250 is unable to correctly determine the current location, the planner 250 may direct the FCU to land or to stop the robot 120.

Relying on various location information, the planner 250 may also include algorithms for collision avoidance purposes. In one embodiment, the planner 250 relies on the distance information, the yaw angle, and center offset information relative to nearby objects to plan the movement of the robot 120 to provide sufficient clearance between the robot 120 and nearby objects. Alternatively, or additionally, the robot 120 may include one or more depth cameras such as a 360-degree depth camera set that generates distance data between the robot 120 and nearby objects. The planner 250 uses the location information from the depth cameras to perform collision avoidance.

The communication engine 255 and the I/O interface 260 are communication components to allow the robot 120 to communicate with other components in the system environment 100. A robot 120 may use different communication protocols, wireless or wired, to communicate with an external component such as the base station 130. Example communication protocols may include Wi-Fi, Bluetooth, NFC, USB, etc. that couple the robot 120 to the base station 130. The robot 120 may transmit various types of data, such as image data, flight logs, location data, inventory data, and robot status information. The robot 120 may also receive inputs from an external source to specify the actions that need to be performed by the robot 120. The commands may be automatically generated or manually generated by an administrator. The communication engine 255 may include algorithms for various communication protocols and standards, encoding, decoding, multiplexing, traffic control, data encryption, etc. for various communication processes. The I/O interface 260 may include software and hardware component such as hardware interface, antenna, and so forth for communication.

The robot 120 also includes a power source 265 used to power various components and the movement of the robot 120. The power source 265 may be one or more batteries or a fuel tank. Example batteries may include lithium-ion batteries, lithium polymer (LiPo) batteries, fuel cells, and other suitable battery types. The batteries may be placed inside permanently or may be easily replaced. For example, batteries may be detachable so that the batteries may be swapped when the robot 120 returns to the base station 130.

While FIG. 2 illustrates various example components, a robot 120 may include additional components. For example, some mechanical features and components of the robot 120 are not shown in FIG. 2. Depending on its type, the robot 120 may include various types of motors, actuators, robotic arms, lifts, other movable components, other sensors for performing various tasks.

Continuing to refer to FIG. 2, an example base station 130 includes a processor 270, a memory 275, an I/O interface 280, and a repowering unit 285. In various embodiments, the base station 130 may include different, fewer, and/or additional components.

The base station 130 includes one or more processors 270 and one or more memories 275 that include one or more set of instructions for causing the processors 270 to carry out various processes that are implemented as one or more software modules. The base station 130 may provide inputs and commands to the robot 120 for performing various inventory management tasks. The base station 130 may also include an instruction set for performing swarm control among multiple robots 120. Swarm control may include task allocation, routing and planning, coordination of movements among the robots to avoid collisions, etc. The base station 130 may serve as a central control unit to coordinate the robots 120. The memory 275 may also include various sets of instructions for performing analysis of data and images downloaded from a robot 120. The base station 130 may provide various degrees of data processing from raw data format conversion to a full data processing that generates useful information for inventory management. Alternatively, or additionally, the base station 130 may directly upload the data downloaded from the robot 120 to a data store, such as the data store 160. The base station 130 may also provide operation, administration, and management commands to the robot 120. In one embodiment, the base station 130 can be controlled remotely by the user device 170, the computing server 150, or the inventory management system 140.

The base station 130 may also include various types of I/O interfaces 280 for communications with the robot 120 and to the Internet. The base station 130 may communicate with the robot 120 continuously using a wireless protocol such as Wi-Fi or Bluetooth. In one embodiment, one or more components of the robot 120 in FIG. 2 may be located in the base station and the base station may provide commands to the robot 120 for movement and navigation. Alternatively, or additionally, the base station 130 may also communicate with the robot 120 via short-range communication protocols such as NFC or wired connections when the robot 120 lands or stops at the base station 130. The base station 130 may be connected to the network 180 such as the Internet. The wireless network (e.g., LAN) in some storage sites 110 may not have sufficient coverage. The base station 130 may be connected to the network 180 via an Ethernet cable.

The repowering unit 285 includes components that are used to detect the power level of the robot 120 and to repower the robot 120. Repowering may be done by swapping the batteries, recharging the batteries, re-filling the fuel tank, etc. In one embodiment, the base station 130 includes mechanical actuators such as robotic arms to swap the batteries on the robot 120. In another embodiment, the base station 130 may serve as the charging station for the robot 120 through wired charging or inductive charging. For example, the base station 130 may include a landing or resting pad that has an inductive coil underneath for wirelessly charging the robot 120 through the inductive coil in the robot. Other suitable ways to repower the robot 120 is also possible.

Example Inventory Management Process

Figure 3:
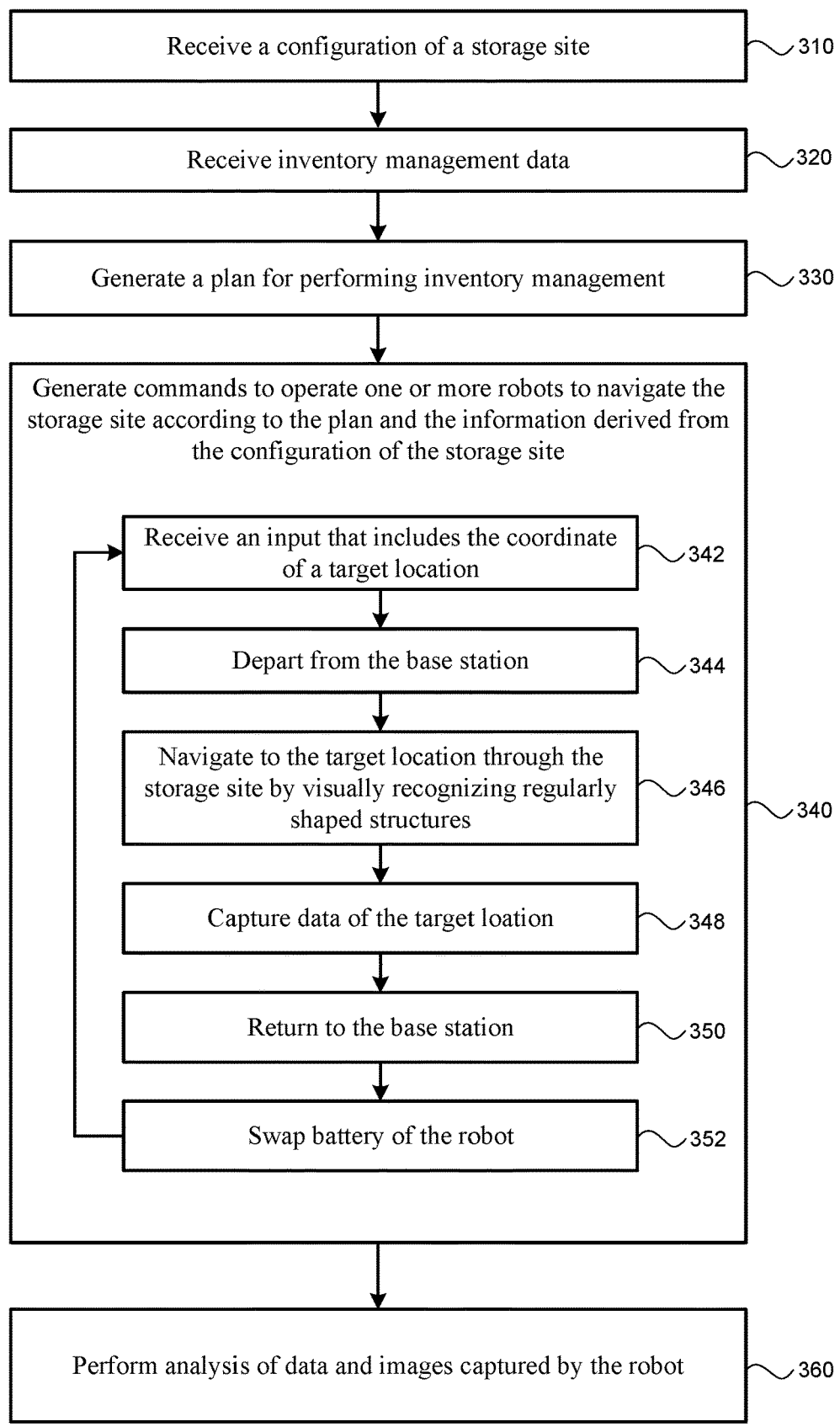
FIG. 3 is a flowchart that depicts an example process for managing the inventory of a storage site, according to an embodiment.

FIG. 3 is a flowchart that depicts an example process for managing the inventory of a storage site, according to an embodiment. The process may be implemented by a computer, which may be a single operation unit in a conventional sense (e.g., a single personal computer) or may be a set of distributed computing devices that cooperate to execute a set of instructions (e.g., a virtual machine, a distributed computing system, cloud computing, etc.). Also, while the computer is described in a singular form, the computer that performs the process in FIG. 3 may include more than one computer that is associated with the computing server 150, the inventory management system 140, the robot 120, the base station 130, or the user device 170.

According to an embodiment, the computer receives 310 a configuration of a storage site 110. The storage site 110 may be a warehouse, a retail store, or another suitable site. The configuration information of the storage site 110 may be uploaded to the robot 120 for the robot to navigate through the storage site 110. The configuration information may include a total number of the regularly shaped structures in the storage site 110 and dimension information of the regularly shaped structures. The configuration information provided may take the form of a computer-aided design (CAD) drawing or another type of file format. The configuration may include the layout of the storage site 110, such as the rack layout and placement of other regularly shaped structures. The layout may be a 2-dimensional layout. The computer extracts the number of sections, aisles, and racks and the number of rows and columns for each rack from the CAD drawing by counting those numbers as appeared in the CAD drawing. The computer may also extract the height and the width of the cells of the racks from the CAD drawing or from another source. In one embodiment, the computer does not need to extract the accurate distances between a given pair of racks, the width of each aisle, or the total length of the racks. Instead, the robot 120 may measure dimensions of aisles, racks, and cells from a depth sensor data or may use a counting method performed by the planner 250 in conjunction with the visual reference engine 240 to navigate through the storage site 110 by counting the number of rows and columns the robot 120 has passed. Hence, in some embodiments, the accurate dimensions of the racks may not be needed.

Some configuration information may also be manually inputted by an administrator of the storage site 110. For example, the administrator may provide the number of sections, the number of aisles and racks in each section, and the size of the cells of the racks. The administrator may also input the number of rows and columns of each rack.

Alternatively, or additionally, the configuration information may also be obtained through a mapping process such as a pre-flight mapping or a mapping process that is conducted as the robot 120 carries out an inventory management task. For example, for a storage site 110 that newly implements the automated management process, an administrator may provide the size of the navigable space of the storage site for one or more mapping robots to count the numbers of sections, aisles, rows and columns of the regularly shaped structures in the storage site 110. Again, in one embodiment, the mapping or the configuration information does not need to measure the accurate distance among racks or other structures in the storage site 110. Instead, a robot 120 may navigate through the storage site 110 with only a rough layout of the storage site 110 by counting the regularly shaped structures along the path in order to identify a target location. The robotic system may gradually perform mapping or estimation of scales of various structures and locations as the robot 120 continues to perform various inventory management tasks.

The computer receives 320 inventory management data for inventory management operations at the storage site 110. Certain inventory management data may be manually inputted by an administrator while other data may be downloaded from the inventory management system 140. The inventory management data may include scheduling and planning for inventory management operations, including the frequency of the operations, time window, etc. For example, the management data may specify that each location of the racks in the storage site 110 is to be scanned every predetermined period (e.g., every day) and the inventory scanning process is to be performed in the evening by the robot 120 after the storage site is closed. The data in the inventory management system 140 may provide the barcodes and labels of items, the correct coordinates of the inventory, information regarding racks and other storage spaces that need to be vacant for incoming inventory, etc. The inventory management data may also include items that need to be retrieved from the storage site 110 (e.g., items on purchase orders that need to be shipped) for each day so that the robot 120 may need to focus on those items.

The computer generates 330 a plan for performing inventory management. For example, the computer may generate an automatic plan that includes various commands to direct the robot 120 to perform various scans. The commands may specify a range of locations that the robot 120 needs to scan or one or more specific locations that the robot 120 needs to go. The computer may estimate the time for each scanning trip and design the plan for each operation interval based on the available time for the robotic inventory management. For example, in certain storage sites 110, robotic inventory management is not performed during the business hours.

The computer generates 340 various commands to operate one or more robots 120 to navigate the storage site 110 according to the plan and the information derived from the configuration of the storage site 110. The robot 120 may navigate the storage site 110 by at least visually recognizing the regularly shaped structures in the storage sites and counting the number of regularly shaped structures. In one embodiment, in addition to the localization techniques such as VIO used, the robot 120 counts the number of racks, the number of rows, and the number of columns that it has passed to determine its current location along a path from a starting location to a target location without knowing the accurate distance and direction that it has traveled.

The scanning of inventory or other inventory management tasks may be performed autonomously by the robot 120. In one embodiment, a scanning task begins at a base station at which the robot 120 receives 342 an input that includes coordinates of target locations in the storage site 110 or a range of target locations. The robot 120 departs 344 from the base station 130. The robot 120 navigates 346 through the storage site 110 by visually recognizing regularly shaped structures. For example, the robot 120 tracks the number of regularly shaped structures that are passed by the robot 120. The robot 120 makes turns and translation movements based on the recognized regularly shaped structures captured by the robot's image sensor 210. Upon reaching the target location, the robot 120 may align itself with a reference point (e.g., the center location) of the target location. At the target location, the robot 120 captures 348 data (e.g., measurements, pictures, etc.) of the target location that may include the inventory item, barcodes, and labels on the boxes of the inventory item. If the initial command before the departure of the robot 120 includes multiple target locations or a range of target locations, the robot 120 continues to the next target locations by moving up, down, or sideways to the next location to continue to scanning operation.

Upon completion of a scanning trip, the robot 120 returns to the base station 130 by counting the number of regularly shaped structures that the robot 120 has passed, in a reversed direction. The robot 120 may potentially recognize the structures that the robot has passed when the robot 120 travels to the target location. Alternatively, the robot 120 may also return to the base station 130 by reversing the path without any count. The base station 130 repowers the robot 120. For example, the base station 130 provides the next commands for the robot 120 and swaps 352 the battery of the robot 120 so that the robot 120 can quickly return to service for another scanning trip. The used batteries may be charged at the base station 130. The base station 130 also may download the data and images captured by the robot 120 and upload the data and images to the data store 160 for further process. Alternatively, the robot 120 may include a wireless communication component to send its data and images to the base station 130 or directly to the network 180.

The computer performs 360 analyses of the data and images captured by the robot 120. For example, the computer may compare the barcodes (including serial numbers) in the images captured by the robot 120 to the data stored in the inventory management system 140 to identify if any items are misplaced or missing in the storage site 110. The computer may also determine other conditions of the inventory. The computer may generate a report to display at the user interface 175 for the administrator to take remedial actions for misplaced or missing inventory. For example, the report may be generated daily for the personnel in the storage site 110 to manually locate and move the misplaced items. Alternatively, or additionally, the computer may generate an automated plan for the robot 120 to move the misplaced inventory. The data and images captured by the robot 120 may also be used to confirm the removal or arrival of inventory items.

Example Navigation Process

Figure 4:
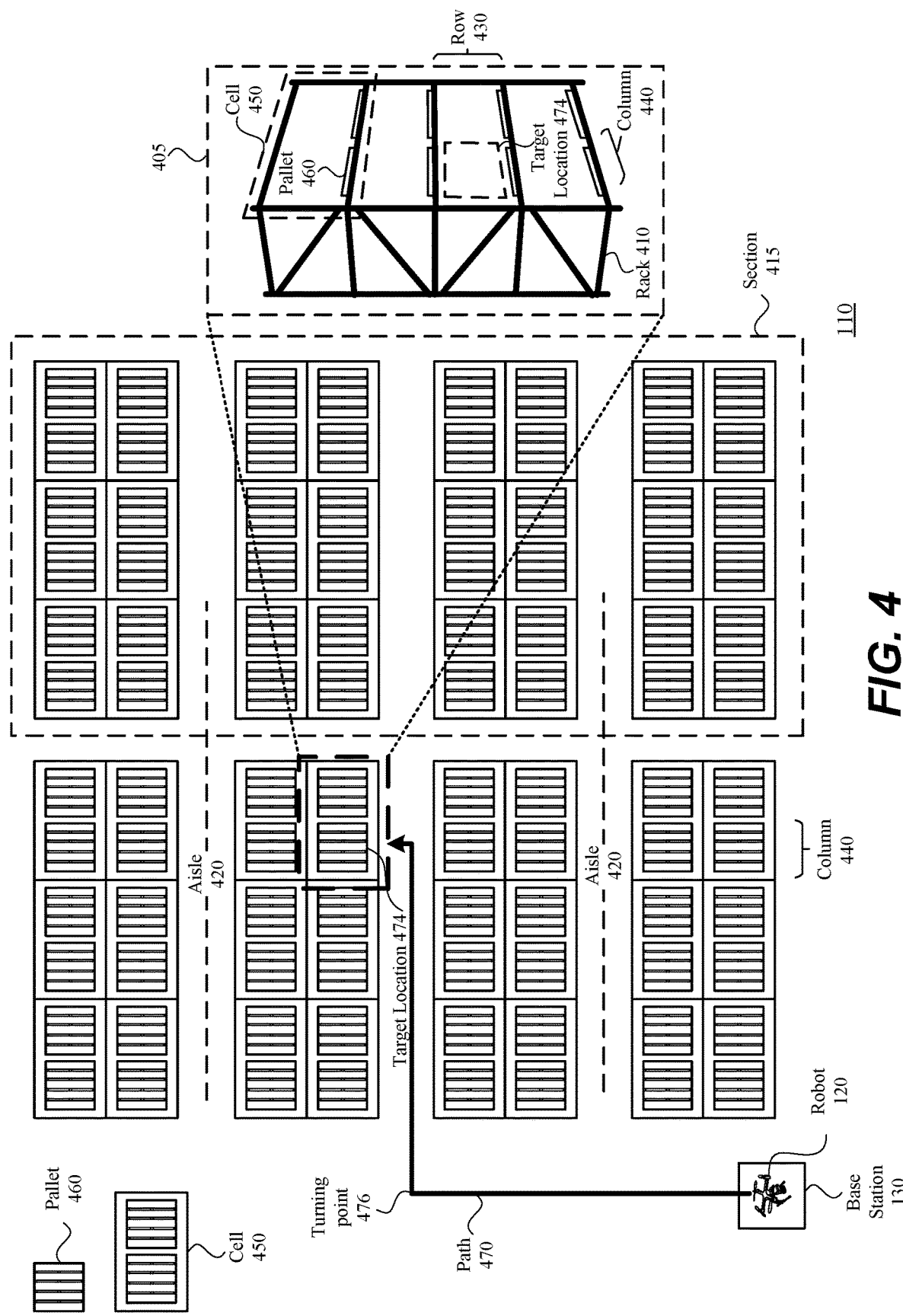
FIG. 4 is a conceptual diagram of an example layout of a storage site that is equipped with a robot, according to an embodiment.

FIG. 4 is a conceptual diagram of an example layout of a storage site 110 that is equipped with a robot 120, according to an embodiment. FIG. 4 shows a two-dimensional layout of storage site 110 with an enlarged view of an example rack that is shown in inset 405. The storage site 110 may be divided into different regions based on the regularly shaped structures. In this example, the regularly shaped structures are racks 410. The storage site 110 may be divided by sections 415, aisles 420, rows 430 and columns 440. For example, a section 415 is a group of racks. Each aisle may have two sides of racks. Each rack 410 may include one or more columns 440 and multiple rows 430. The storage unit of a rack 410 may be referred to as a cell 450. Each cell 450 may carry one or more pallets 460. In this particular example, two pallets 460 are placed on each cell 450. Inventory of the storage site 110 is carried on the pallets 460. The divisions and nomenclature illustrated in FIG. 4 are used as examples only. A storage site 110 in another embodiment may be divided in a different manner.

Each inventory item in the storage site 110 may be located on a pallet 460. The target location (e.g., a pallet location) of the inventory item may be identified using a coordinate system. For example, an item placed on a pallet 460 may have an aisle number (A), a rack number (K), a row number (R), and a column number (C). For example, a pallet location coordinate of [A3, K1, R4, and C5] means that the pallet 460 is located at a rack 410 in the third aisle and the north rack. The location of the pallet 460 in the rack 410 is in the fourth row (counting from the ground) and the fifth column. In some cases, such as the particular layout shown in FIG. 4, an aisle 420 may include racks 410 on both sides. Additional coordinate information may be used to distinguish the racks 410 at the north side and the racks 410 at the south side of an aisle 420. Alternatively, the top and bottom sides of the racks can have different aisle numbers. For a spot check, a robot 120 may be provided with a single coordinate if only one spot is provided or multiple coordinates if more than one spot is provided. For a range scan that checks a range of pallets 460, the robot 120 may be provided with a range of coordinates, such as an aisle number, a rack number, a starting row, a starting column, an ending row, and an ending column. In some embodiments, the coordinate of a pallet location may also be referred in a different manner. For example, in one case, the coordinate system may take the form of "aisle-rack-shelf-position." The shelf number may correspond to the row number and the position number may correspond to the column number.

Figure 5:
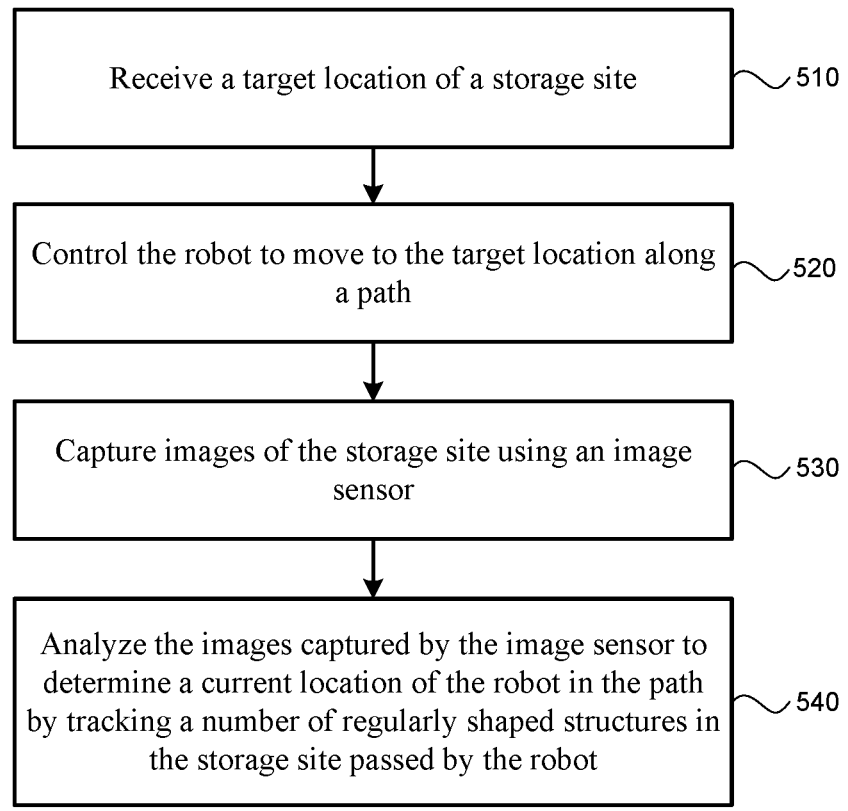
FIG. 5 is a flowchart depicting an example navigation process of a robot, according to an embodiment.

Referring to FIG. 5 in conjunction with FIG. 4, FIG. 5 is a flowchart depicting an example navigation process of a robot 120, according to an embodiment. The robot 120 receives 510 a target location 474 of a storage site 110. The target location 474 may be expressed in the coordinate system as discussed above in association with FIG. 4. The target location 474 may be received as an input command from a base station 130. The input command may also include the action that the robot 120 needs to take, such as taking a picture at the target location 474 to capture the barcodes and labels of inventory items. The robot 120 may rely on the VIO unit 236 and the altitude estimator 238 to generate localization information. In one case, the starting location of a route is the base station 130. In some cases, the starting location of a route may be any location at the storage site 110. For example, the robot 120 may have recently completed a task and started another task without returning to the base station 130.

The processors of the robot 120, such as the one executing the planner 250, control 520 the robot 120 to the target location 474 along a path 470. The path 470 may be determined based on the coordinate of the target location 474. The robot 120 may turn so that the image sensor 210 is facing the regularly shaped structures (e.g., the racks). The movement of the robot 120 to the target location 474 may include traveling to a certain aisle, taking a turn to enter the aisle, traveling horizontally to the target column, traveling vertically to the target row, and turning to the right angle facing the target location 474 to capture a picture of inventory items on the pallet 460. An example of the precise planning and the action taken by a robot 120 will be discussed in further detail with reference to FIG. 7.

As the robot 120 moves to the target location 474, the robot 120 captures 530 images of the storage site 110 using the image sensor 210. The images captured may be in a sequence of images. The robot 120 receives 540 the images captured by the image sensor 210 as the robot 120 moves along the path 470. The images may capture the objects in the environment, including the regularly shaped structures such as the racks. For example, the robot 120 may use the algorithms in the visual reference engine 240 to visually recognize the regularly shaped structures.

The robot 120 analyzes 550 the images captured by the image sensor 210 to determine the current location of the robot 120 in the path 470 by tracking the number of regularly shaped structures in the storage site passed by the robot 120. The robot 120 may use various image processing and object recognition techniques that will be discussed in further detail with reference to FIG. 6A to identify the regularly shaped structures and to track the number of structures that the robot 120 has passed. Referring to the path 470 shown in FIG. 4, the robot 120, facing the racks 410, may travel to the turning point 476. The robot 120 determines that it has passed two racks 410 so it has arrived at the target aisle. In response, the robot 120 turns counterclockwise and enter the target aisle facing the target rack. The robot 120 counts the number of columns that it has passed until the robot 120 arrives at the target column. Depending on the target row, the robot 120 may travel vertically up or down to reach the target location. Upon reaching the target location, the robot 120 performs the action specified by the input command, such as taking a picture of the inventory at the target location.

Example Visual Reference Operation

Figure 6A:
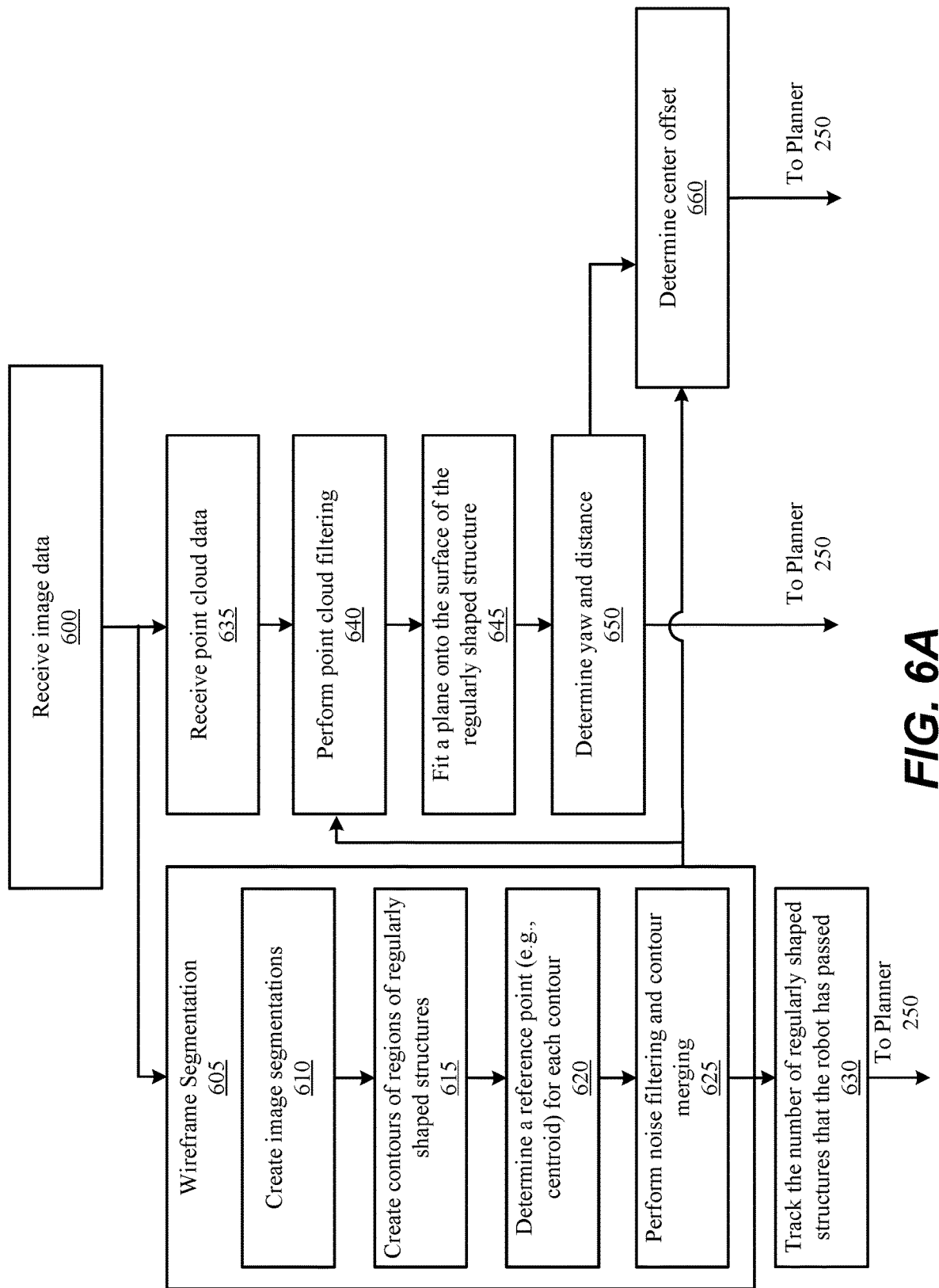
FIG. 6A is a flowchart depicting an example visual reference operation, according to an embodiment.

FIG. 6A is a flowchart depicting an example visual reference operation that may be executed by one or more algorithms of a robot 120 for recognizing objects in the environment, tracking the number of structures that the robot 120 has passed in a path, and determining various types of location information, according to an embodiment. The operation that is shown in FIG. 6A may be performed by algorithms that correspond to the visual reference engine 240 of the robot 120.

A robot 120 receives 600 image data from the image sensor 210 that captures the environment of a storage site 110. In one embodiment, the image sensor 210 is a stereo camera that includes multiple lenses to capture depth information. The image data received by the robot 120 may include pixel data in a suitable format such as RGB and may also include point cloud with spatial information such as x, y, and z measurement, where z may represent the depth information (e.g., the distance between the robot 120 and an object). For example, the image sensor 210 includes a depth camera that generates depth data of objects within a field of view of the depth camera. The image data may take the form of a series of consecutive images that capture the gradual change in the relative positions of the objects in the environment. In one embodiment, the image sensor 210 may be another type of sensor such as a regular single-lens digital camera, a LIDAR sensor, an infrared sensor, etc. that generates different types of image data. For example, an embodiment of the robot 120 may use a regular digital camera that generates only RGB pixel data.

Based on the received image data, the robot 120 may determine different types of information related to the location of the robot 120, such as the number of regularly shaped structures that the robot 120 has passed, the yaw angle and distance between the robot 120 and an object, and center offset information of the robot 120 relative to a structure. The location information may be generated by the visual reference engine 240 and provided to the planner 250 for the planner 250 to control the movement of the robot 120. The location information may be provided to the planner 250 in different manners. Certain information may be provided to the planner 250 constantly and periodically. Other information may be provided to the planner 250 in response to a request from the planner 250. For example, in one embodiment, the count of structures passed by the robots 120 and the yaw and distance information may be provided to the planer 250 constantly, while the center offset information may be provided to the planner 250 on demand. The planner 250 usually requests for the center offset information when the robot 120 changes directions (e.g., rotations, transitions from horizontal movement to vertical movement, transitions from vertical movement to horizontal movement).

The robot 120 may use wireframe segmentation 605 to recognize nearby structures, which may be regularly shaped structures or other types of structures. The robot 120 creates 610 image segmentation for the images captured by the image sensor 210. The robot 120 segments an image based on the types of objects captured in the image. For example, the robot 120 may separate readily identifiable objects, such as regularly shaped structures (e.g., racks), from the rest of the environment by image segmentation that identifies the outline of the structures. For each image, the image segmentation may further distinguish different portions of a regularly shaped structure, such as vertical bars and horizontal bars. Based on the structures (or regions of the structures) identified, the robot 120 may mark the pixels in the image using different markers. For example, pixels corresponding to the identified vertical bars may be marked as "1" or a first suitable symbol; pixels corresponding to the identified horizontal bars may be marked as "2" or a second suitable symbol; and pixels correspond to the rest of the environment may be marked as "0" or a third suitable symbol.

The image segmentation may be carried out by any suitable algorithms. In one embodiment, the robot 120 stores a trained machine learning model to perform the image segmentation and to assign labels to the pixels. The robot 120 inputs an image to the machine learning model, which outputs markings of different types of segments in the image. In one embodiment, the robot 120 inputs a series of images and the machine learning model outputs image segmentations from the series of images by taking into account the object appearing continuously in the series of images. In one embodiment, the machine learning model is a convolutional neural network. The convolutional neural network may be trained using a training set of images of various storage sites' environment that includes different types of structures. For example, the convolutional neural network may be trained by iteratively reducing the errors in the assignment of segments to the training set of images. An example structure of a convolutional neural network that may be used to perform the image segmentation is discussed in further detail in FIG. 8. Alternative to or in addition to the convolution neural network, other types of machine learning models, such as another type of a neural network, clustering, Markov random field (MRF), etc., may also be used in the image segmentation process. Alternative to or in addition to using any machine learning techniques, other image segmentation algorithms such as edge detection algorithms (e.g., Canny operator, Laplacian operator, Sobel operator, Prewitt operator), corner detection algorithms, Hough transform, and other suitable feature detection algorithms may also be used.

From the pixels that are tagged with symbols representing the regularly shaped structures, the robot 120 creates 615 contours of regions of those pixels. Each contour may be referred to as a cluster of pixels. Clustering of those pixels may be based on distances among the pixels, the colors of the pixels, the intensities of the pixels, and/or other suitable characteristics of the pixels. The robot 120 may cluster similar nearby pixels (e.g., in terms of distances, colors, and/or intensities) to create a contour that is likely to correspond to a region of a regularly shaped structure. Multiple clusters that correspond to various sub-regions may be created for each regularly shaped structure (e.g., each vertical bar). The robot 120 determines 620 a reference point for each contour. The reference point may be the centroid, the most extreme point in one direction, or any relevant reference point. For example, the robot 120 may determine the average of the pixel locations for pixels that are within the contour to determine the centroid.

Figure 6B:
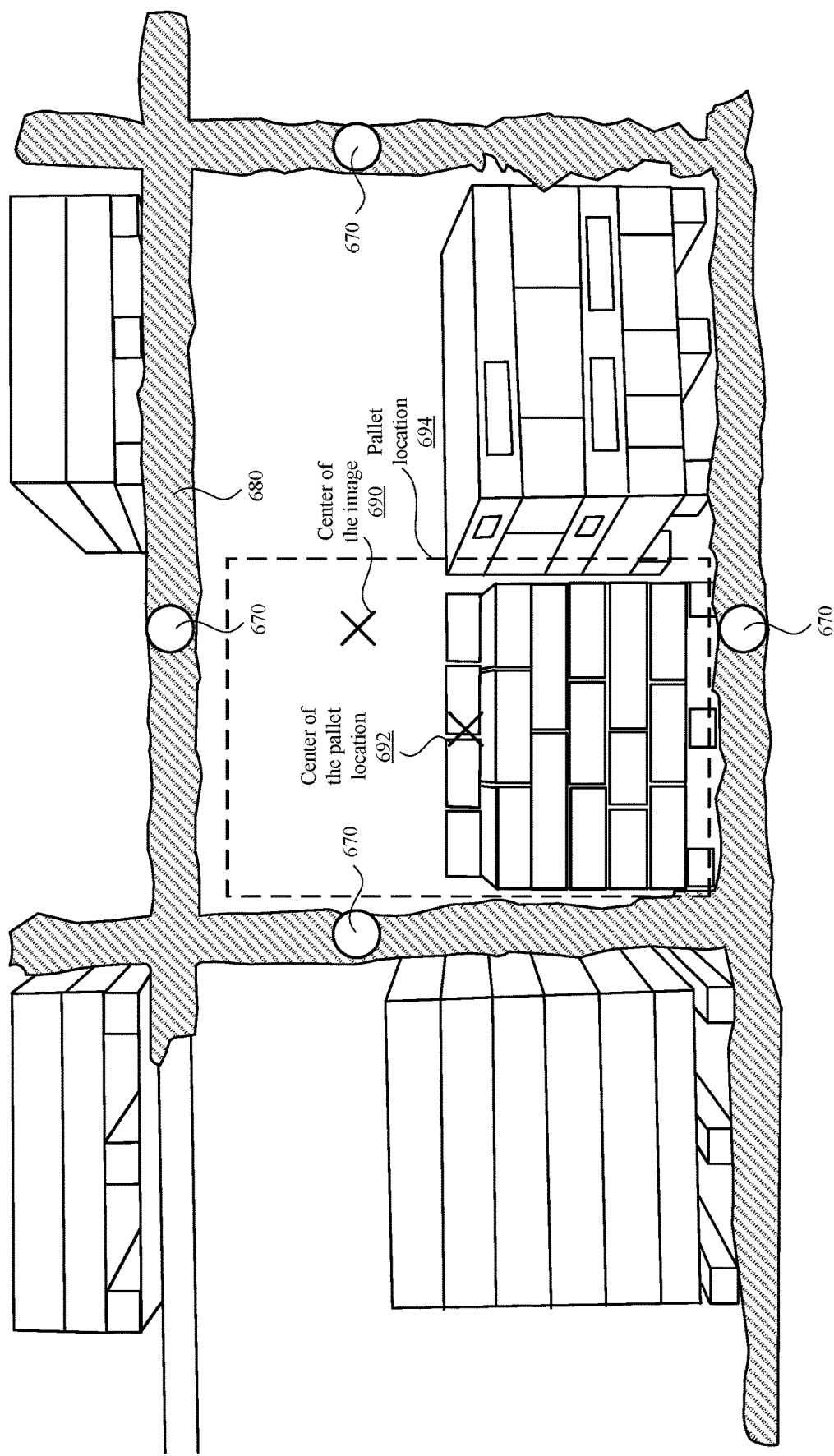
FIG. 6B is a conceptual diagram that illustrates a result of image segmentation, according to an embodiment.

The robot 120 performs 625 noise filtering and contour merging that merges contours based on their respective reference points. For noise filtering, the robot 120 may regard contours whose areas are smaller than a threshold (e.g., contours that are too small) as noise. The robot 120 keeps contours that are sufficiently large. For contour merging, in some cases, the clustering algorithm results in pixels corresponding to a structure (e.g., a vertical bar) being classified into multiple contours (e.g., multiple regions of the vertical bar). The robot 120 merges contours that likely represent the same portion of the structure. The merging may be based on the positions of the reference points of the contours and the boundaries of the contours. For example, for a horizontal bar, the robot 120 may identify contours that have reference points in a similar vertical level and merge those contours. In some cases when two contours are merged, pixels between the two contours, which may belong to a smaller cluster or may not be identified in any cluster, may also be classified as the same structure. Merging may be based on the distance between two reference points of two contours. If the distance is smaller than a threshold level, the robot 120 may merge the two contours. FIG. 6B illustrates examples of regularly shaped structures that are identified by image segmentation, contouring, and merging of the contours. FIG. 6B shows that the robot 120 can separate an image of a rack from the rest of the environment.

Based on the identified structures such as the vertical bars and horizontal bars of the regularly shaped structures, the robot 120 tracks 630 the number of regularly shaped structures that the robot 120 has passed along a path to a target location. The information may be determined by the visual reference engine 240 and be outputted to the planner 250. The robot 120 may determine the count of regularly shaped structures passed by robot 120 by monitoring the relative movement of a regularly shaped structure captured in a series of images. For example, the robot 120, using wireframe segmentation 605, may identify that a portion (e.g., a vertical bar) of a regularly shaped structure (e.g., a rack) is captured in an image in a series, which may be referred to as the first image. The robot 120 examines the next image in the series. The robot 120 identifies the same vertical bar in the images subsequent to the first image. For instance, in the second image that is immediately subsequent to the first image, the robot 120 may determine that a vertical bar that is closest to the position of the vertical bar appeared in the first image as the same vertical bar. The vertical bar may continue to be tracked until it moves out of the image boundary as the robot 120 continues to examine the series of images. Alternatively, or additionally, in tracking the same portion of the same structure, the robot 120 may predict the movement of the regularly shaped structure. For example, if the robot 120 travels from left to right, the robot 120 will expect that the same regularly shaped structure appears from right to left in a series of images. Alternatively, or additionally, the robot 120 may also take into account its projected movement speed and the frame rate of capturing images to predict the change in position of the same regularly shaped structure from one image to another image.

To determine that the robot 120 has passed a regularly shaped structure, the robot 120 may set one or more objective criteria. The robot 120 may track the movement of a reference point of the portion of a target regularly shaped structure across the first image and the second images in a series of images. In response to the reference point for the portion of the structure passing a certain location of the images (e.g., the middle point of the images), the robot 120 increments the count of regularly shaped structures (or a sub-type, e.g., vertical bars, horizontal bars, etc.) that the robot 120 has passed. For example, in a series of images, the robot 120 tracks the centroid of a vertical bar to determine if the centroid has moved passed the center of an image. When this condition is met, the robot 120 increments the count of vertical bars that the robot 120 has passed and continues to track the next vertical bar captured in the images. By counting those structures, the robot 120 can track the number of racks, the number of aisles, the number of rows, and the number of columns that the robot 120 has passed in the storage site 110.

In some embodiments, the robot 120 may track the number of regularly shaped structures that the robot 120 has passed by using other information in addition to the data from wireframe segmentation 605. For example, the robot 120 may determine the row level at which the robot is located by using the altitude estimator 238. The count of the horizontal bars that are passed by the robot 120 generated from wireframe segmentation 605 can be used to confirm the determination from the altitude estimator 238.

In some embodiments, the visual reference engine 240 may also use the information generated by wireframe segmentation 605 to determine other location data of the robot 120. For example, the information from wireframe segmentation 605 can be used in conjunction with point cloud data for determining the yaw and distance of the robot 120 relative to an object. Also, the identified vertical bars and horizontal bars may be used for center offset determination, which will be discussed in further detail.

In addition to analyzing the image data for wireframe segmentation 605, the robot 120 may also use the image data to generate location information such as yaw and distance. By way of example, the robot 120 may receive 635 point cloud data from an image sensor 210, such as a stereo camera. The robot 120 performs 640 a point cloud filtering operation. Based on the information from wireframe segmentation 605, the filtering operation may remove points that are not the regularly shaped structures and keep the points that are determined to be likely corresponding to the regularly shaped structures. The robot 120 may identify points corresponding to the regularly shaped structures appearing in the image captured at the target location. The robot 120 may arrange the remaining points in a histogram based on the depth value of each point. The robot 120 may select one or more bars in the histogram that have the most points. In other words, the robot 120 may keep the dominant points near the peaks. Those points are likely corresponding to regularly shaped structures. Other filtering techniques may also be used to select points for further processing.

Based on the filtered point cloud, the robot 120 fits 645 the point cloud to a plane to estimate one or more surfaces of regularly shaped structures. Various plane fitting techniques such as least-square plane fitting may be used. The robot 120 uses the fit plane to determine 650 yaw and distance information. For example, the robot 120 determines, using the depth data of the points that are fit to a plane, the distance between the robot 120 and the regularly shaped structure represented by the plane. The robot 120 may also determine an estimated yaw angle of the robot relative to the regularly shaped structure represented by the plane. The robot 120 may determine the yaw angle using geometry operations. The location information that includes yaw and distance may be provided to the planner 250.

The location information determined by the visual reference engine 240 may also include a center offset of the robot 120. The center offset may be an offset of the robot 120 compared to a center of a location (which usually is a pallet location, but can also be a cell location or another suitable location). The visual reference engine 240 determines 660 a center offset of the robot 120 relative to the location in front of the robot 120. The visual reference engine 240 may rely on the wireframe segmentation 605 and the yaw and distance information 650 determined by the point cloud data to determine 660 the center offset. FIG. 6B shows an example image annotated by the robot 120 to illustrate the determination of the center offset. The dots 670 shown in FIG. 6B represent projections of the camera of the robot 120 relative to the regularly shaped structure. The center of the image 690 in FIG. 6B is assumed to the location of the camera of the robot 120. The center 690 is projected horizontally and vertically to the regularly shaped structures and is displayed as the four dots 670. The visual reference engine 240 uses information from wireframe segmentation 605 to generate merged contours 680. Based on the merged contours 680, the robot 120 identifies the center 692 of a pallet location 694. Based on the center 692 of the pallet location 694 and the center of the image 690, the center offset may be determined.

The robot 120 may be directed to capture a picture of a pallet location. The robot 120 uses the location information, such as center offset, yaw, and distance to determine the offset of the robot 120 from the center of the target location. In response to determining that the center offset is within a threshold distance from the center of the pallet location (or any other suitable target points), the robot 120 may take a picture of the target pallet location by the image sensor 210 so that the inventory items currently located on the pallet can be captured.

Example Planner Operation

Figure 7:
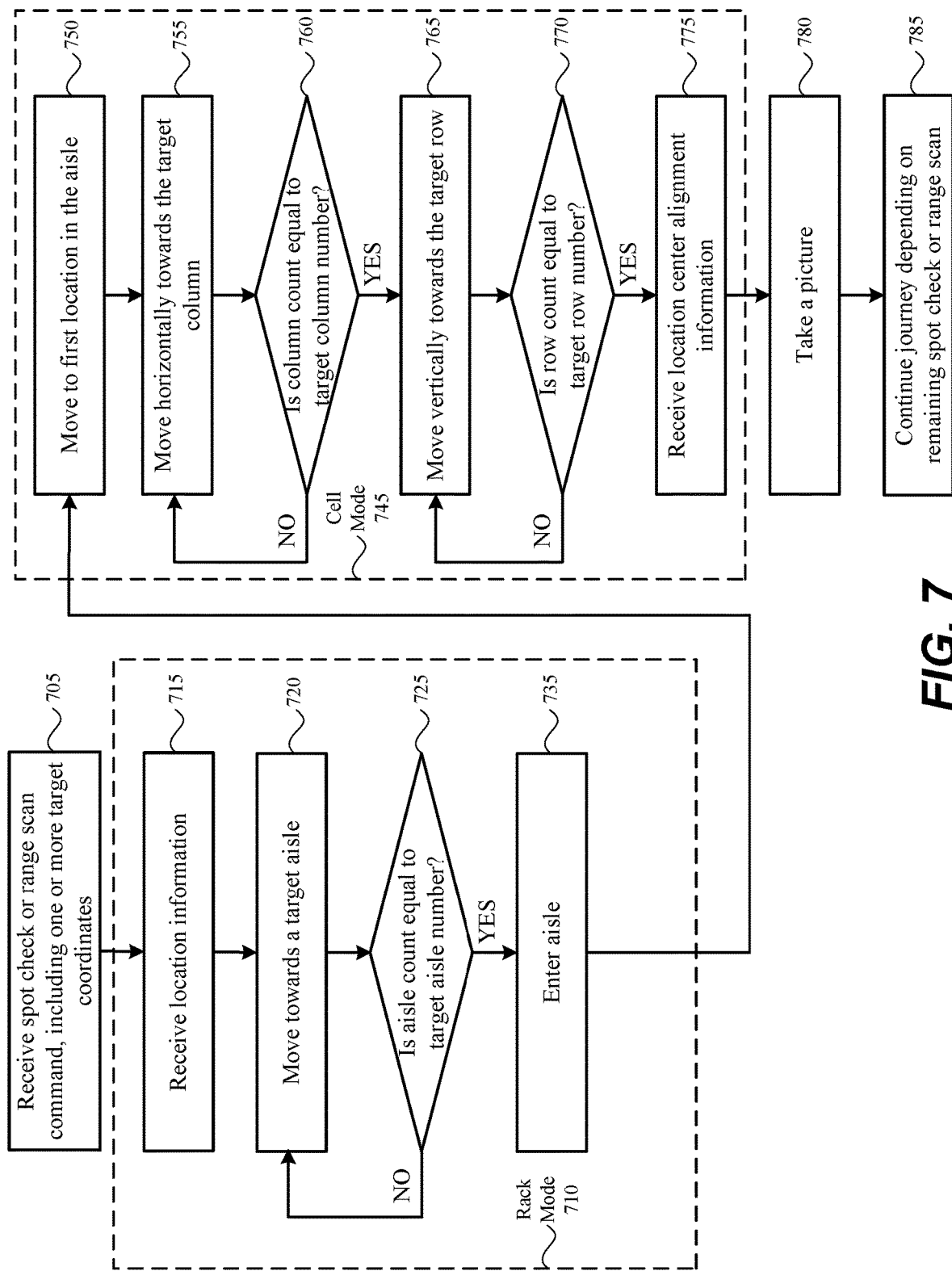
FIG. 7 is a flowchart depicting a planner algorithm, according to an embodiment.

FIG. 7 is a flowchart depicting an example of a planning algorithm for a robot 120 to determine a path to a target location. The process may be performed by the planner 250. The planning algorithm may include a rack mode 710 and a cell mode 745. In the rack mode 710, the robot 120 may first identify the number of racks (or other suitable regularly shaped structures) that the robot has passed to identify the appropriate aisle for the robot to enter. After the robot 120 enters an aisle, the robot 120 may turn to the cell mode 745, which identifies the correct cell that includes the pallet corresponding to the target location. The robot 120 may rely on the recognition of objects and counting of regularly shaped structures that are generated by the visual reference operation discussed in FIG. 6A.

The robot 120 receives 705 a command for a spot check mission or a range scan mission. A spot check mission may include visiting one or more discrete target locations that are not necessarily related to each other. A range scan mission may include scanning a range of target locations, such as several columns and rows. For example, a range scan command may include a certain range that includes a starting spot and an ending spot. In one embodiment, the robot 120 may distinguish the spot check mission and the range scan mission by the number of spots in commands. In either spot check or range scan, the command includes at least one coordinate, which may specify a target location in a spot check or a starting spot for a range scan. The coordinate may specify the aisle number, the rack number, the row number, and the column number. In a range scan mission, the robot 120 may also be provided with a range of target location coordinates. The robot 120, based on the range, may determine a route for the range scan that is efficient in completing the range scan. For example, the robot 120 may determine that it is more efficient to move horizontally for a row first and then move up to scan another row.

In response to receiving a spot check command or a range scan command, the robot 120 enters the rack mode 710. The robot 120 receives 715 location information, such as data generated by the visual reference engine 240. The robot 120 may determine a first target location, which can be one of the spots in spot check mission or the first location in a range scan mission. In the rack mode 710, the robot 120, based on the coordinate of the first target location, moves 720 towards a target aisle. The robot 120 visually identifies the regularly shaped structures and counts, for example, the number of the regularly shaped structures that the robot 120 has passed. Based on the visual reference information, the robot 120 determines 725 whether the current aisle count equals to the target aisle number (or whether the rack count equals to the target rack number). If not, the robot 120 continues to move towards the target aisle and continue to track the rack count. If the aisle count equals the target aisle number, the robot 120 enters 735 the target aisle. Based on the location information, the robot 120 determines a sufficient clearance distance between the robot 120 and the rack to avoid colliding the rack when the robot 120 enters 735 the target aisle.

Upon entering the target aisle, the robot 120 may enter the cell mode 745. The robot 120 moves 750 to the first location in the aisle. The robot 120 moves 755 horizontally towards the target location. The robot 120 counts the number of columns that the robot 120 has passed based on the visual reference data. The robot 120 determines 760 whether the column count equals to the target column number. If not, the robot 120 continues to move horizontally towards the target location. If the column count equals the target column number, the robot 120 will determine that the robot 120 has arrived at the target column and may move 765 vertically towards the target location. For example, the robot 120 may move up or down one or more rows. The robot 120 determines 770 whether the row counts equal to the target row number. If not, the robot 120 continues to move vertically towards the target location. If so, the robot 120 determines that the robot has arrived at the target location. Relying on the location information such as center offset, the robot 120 receives 775 location center alignment information to align itself with a target point of the target location. The robot 120 performs an inventory management task assigned, such as taking 780 a picture of the target location. Upon completion of the inventory management task, the robot 120 may continue 785 the journey depending on the remaining spot check or range scan.

The order specified in various flowcharts in this disclosure may be changed. For example, the order of the horizontal movement 755 and the vertical movement 765 may be interchanged. After the robot 120 performs the assigned task at a first target location, the robot 120 may move to a next location to perform another task if a range of target locations or multiple locations is provided (e.g., in a range scan mission).

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, the process of image segmentation discussed in FIG. 6A, various object recognition, localization, and other processes may apply one or more machine learning and deep learning techniques. In one embodiment, image segmentation is performed using a CNN, whose example structure is shown in FIG. 8.

In various embodiments, the training techniques for a machine learning model may be supervised, semi-supervised, or unsupervised. In supervised learning, the machine learning models may be trained with a set of training samples that are labeled. For example, for a machine learning model trained to classify objects, the training samples may be different pictures of objects labeled with the type of objects. The labels for each training sample may be binary or multi-class. In training a machine learning model for image segmentation, the training samples may be pictures of regularly shaped objects in various storage sites with segments of the images manually identified. In some cases, an unsupervised learning technique may be used. The samples used in training are not labeled. Various unsupervised learning technique such as clustering may be used. In some cases, the training may be semi-supervised with training set having a mix of labeled samples and unlabeled samples.

A machine learning model may be associated with an objective function, which generates a metric value that describes the objective goal of the training process. For example, the training may intend to reduce the error rate of the model in generating predictions. In such a case, the objective function may monitor the error rate of the machine learning model. In object recognition (e.g., object detection and classification), the objective function of the machine learning algorithm may be the training error rate in classifying objects in a training set. Such an objective function may be called a loss function. Other forms of objective functions may also be used, particularly for unsupervised learning models whose error rates are not easily determined due to the lack of labels. In image segmentation, the objective function may correspond to the difference between the model's predicted segments and the manually identified segments in the training sets. In various embodiments, the error rate may be measured as cross-entropy loss, L1 loss (e.g., the sum of absolute differences between the predicted values and the actual value), L2 loss (e.g., the sum of squared distances).

Figure 8:
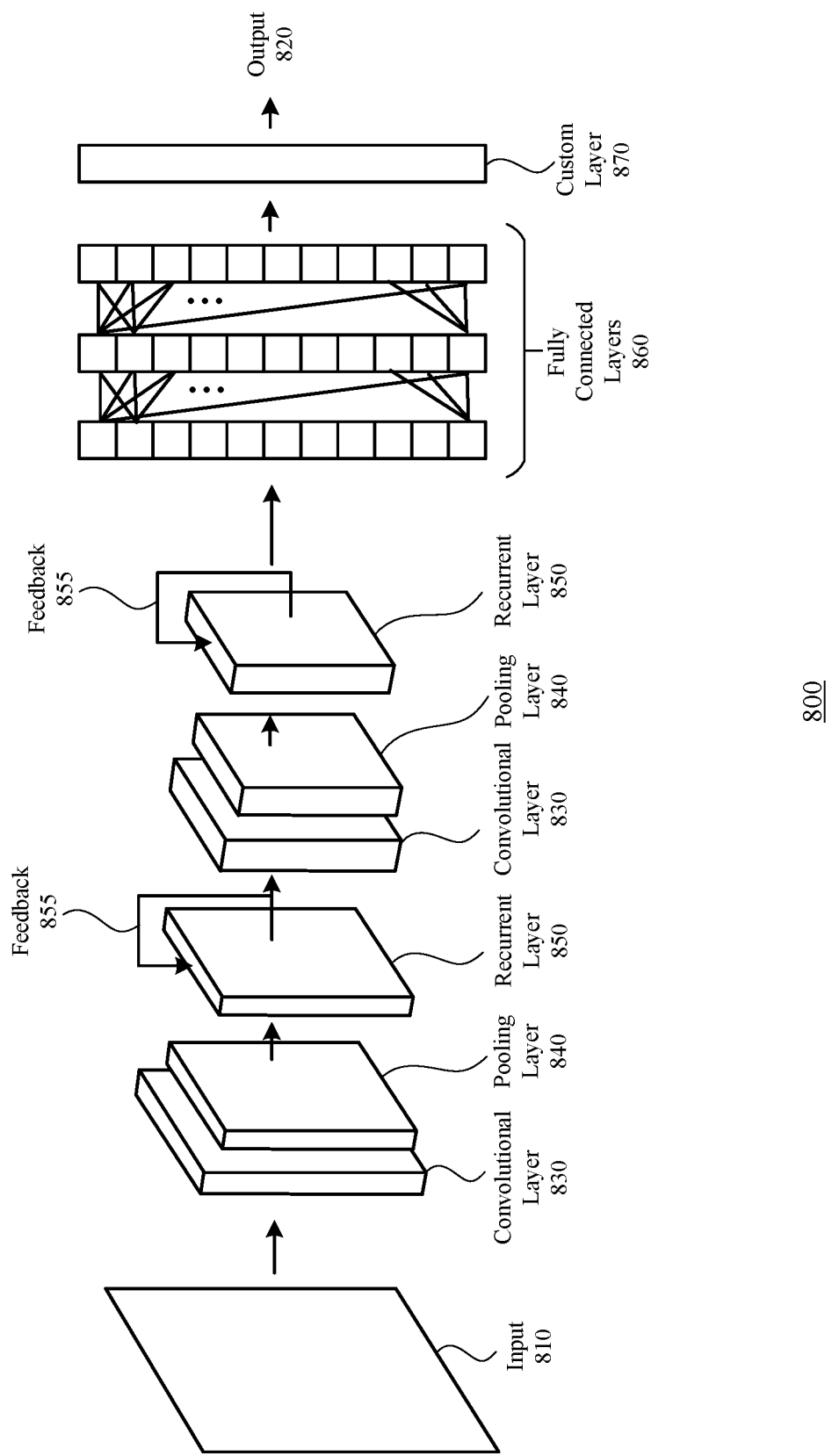
FIG. 8 is a block diagram illustrating an example machine learning model, according to an embodiment.

Referring to FIG. 8, a structure of an example CNN is illustrated, according to an embodiment. The CNN 800 may receive an input 810 and generate an output 820. The CNN 800 may include different kinds of layers, such as convolutional layers 830, pooling layers 840, recurrent layers 850, full connected layers 860, and custom layers 870. A convolutional layer 830 convolves the input of the layer (e.g., an image) with one or more kernels to generate different types of images that are filtered by the kernels to generate feature maps. Each convolution result may be associated with an activation function. A convolutional layer 830 may be followed by a pooling layer 840 that selects the maximum value (max pooling) or average value (average pooling) from the portion of the input covered by the kernel size. The pooling layer 840 reduces the spatial size of the extracted features. In some embodiments, a pair of convolutional layer 830 and pooling layer 840 may be followed by a recurrent layer 850 that includes one or more feedback loop 855. The feedback 855 may be used to account for spatial relationships of the features in an image or temporal relationships of the objects in the image. The layers 830, 840, and 850 may be followed in multiple fully connected layers 860 that have nodes (represented by squares in FIG. 8) connected to each other. The fully connected layers 860 may be used for classification and object detection. In one embodiment, one or more custom layers 870 may also be presented for the generation of a specific format of output 820. For example, a custom layer may be used for image segmentation for labeling pixels of an image input with different segment labels.

The order of layers and the number of layers of the CNN 800 in FIG. 8 is for example only. In various embodiments, a CNN 800 includes one or more convolutional layer 830 but may or may not include any pooling layer 840 or recurrent layer 850. If a pooling layer 840 is present, not all convolutional layers 830 are always followed by a pooling layer 840. A recurrent layer may also be positioned differently at other locations of the CNN. For each convolutional layer 830, the sizes of kernels (e.g., 3×3, 5×5, 7×7, etc.) and the numbers of kernels allowed to be learned may be different from other convolutional layers 830.

A machine learning model may include certain layers, nodes, kernels and/or coefficients. Training of a neural network, such as the CNN 800, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tan h), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing prediction, object detection, image segmentation, or another suitable task for which the model is trained.

Computing Machine Architecture

Figure 9:
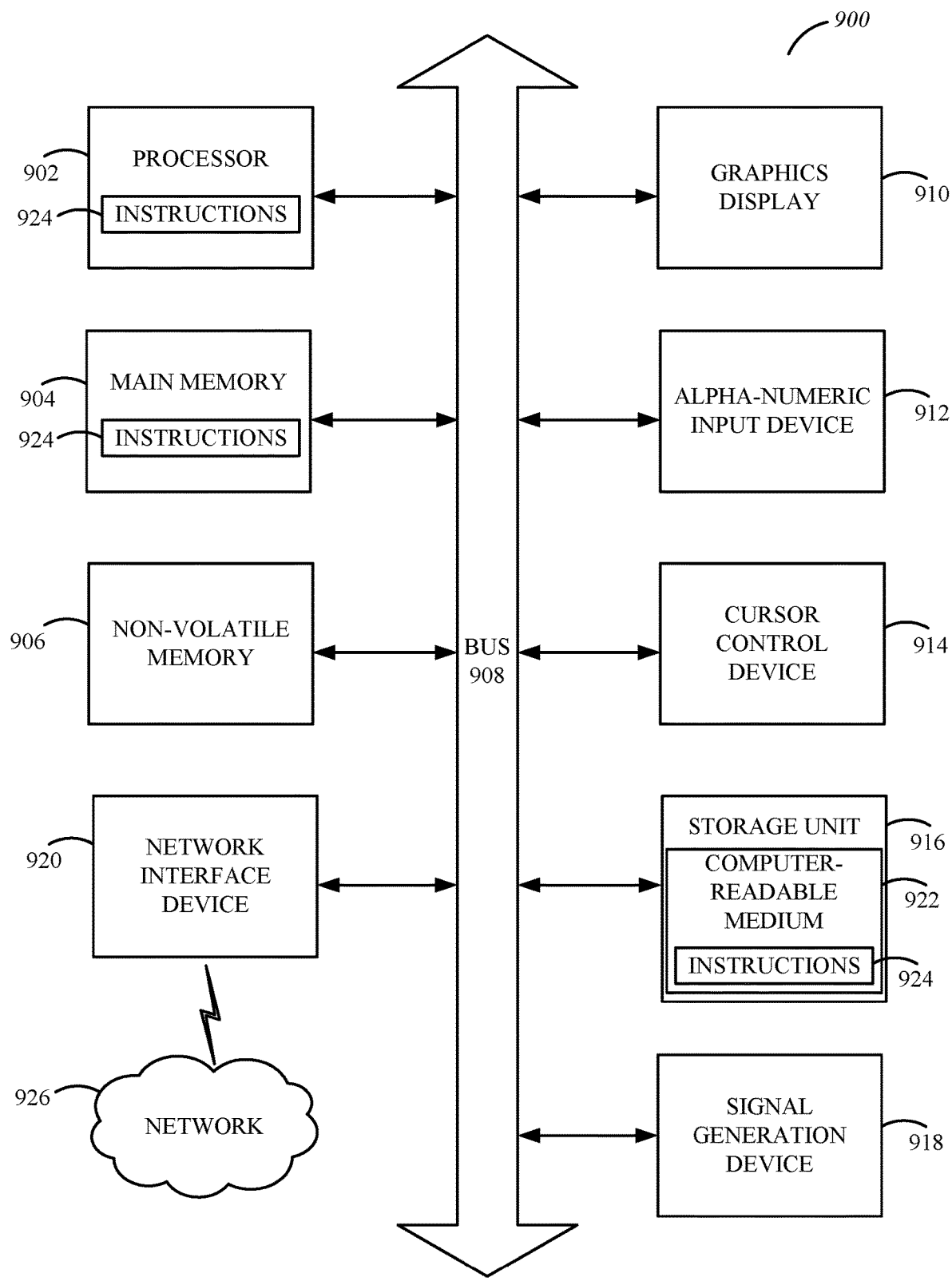
FIG. 9 is a block diagram illustrating components of an example computing machine, according to an embodiment.

FIG. 9 is a block diagram illustrating components of an example computing machine that is capable of reading instructions from a computer-readable medium and execute them in a processor (or controller). A computer described herein may include a single computing machine shown in FIG. 9, a virtual machine, a distributed computing system that includes multiples nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a network deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1 and 2, including but not limited to, the inventory management system 140, the computing server 150, the data store 160, the user device 170, and various engines, modules, interfaces, terminals, and machines shown in FIG. 2. While FIG. 9 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors (generally, processor 902) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 904, and a non-volatile memory 906, which are configured to communicate with each other via a bus 908. The computer system 900 may further include graphics display unit 910 (e.g., a plasma display panel (PDP), a liquid crystal display (LCD), a projector, or a cathode ray tube (CRT)). The computer system 900 may also include alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a computer-readable medium 922 on which is stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

Beneficially, by recognizing regularly shaped structures in a storage site and use the count of the structures to navigate through the storage site, the robotic system automatizes a storage site without adding significant overhead to the storage site. Conventional robots often require code markings such as QR codes that are placed at each rack to recognize the racks in order to navigate through the storage site. However, the addition of QR codes in a storage site imposes a significant upfront cost on a conventional storage site to become automated. Also, the use of QR codes presents continuous maintenance costs for the storage site. The use of a robotic system in some of the embodiments may allow robots to navigate through a storage site without prior mapping.

Certain embodiments are described herein as including logic or a number of components, engines, modules, or mechanisms. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or temporarily configured circuitry (e.g., configured by software) may be driven by cost and time considerations.

The various operations of example methods described herein may be performed, at least partially, by one or more processors, e.g., processor 902, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A method for operating an inventory robot, the method comprising:
   receiving a target location in a storage site, the target location defined by a coordinate that specifies a target aisle, a target rack, a row number of the rack, and a column number of the rack;
   controlling the inventory robot to move to the target location along a path;
   capturing images using one or more image sensors as the inventory robot moves along the path; and
   analyzing the images captured by the one or more image sensors to determine a current location of the inventory robot in the path by tracking a number of structures in the storage site passed by the inventory robot, the structures comprising racks with rows and columns, wherein determining the current location of the inventory robot in the path comprises:
      counting a number of racks that the inventory robot has passed based on the rack number,
      turning into an aisle at which the target rack is located,
      counting the number of columns that the inventory robot has passed based on the column number to locate the target location, and
      moving to a row corresponding to the row number.

2. The method of claim 1, wherein analyzing the images further comprises:
   creating image segmentations from the images captured, an image segmentation in one of the images comprises a segment of frames of the structures appearing in the one of the images; and
   identifying the structures using the image segmentation in the one of the images.

3. The method of claim 2, wherein the image segmentations are created by using at least a convolutional neural network.

4. The method of claim 1, wherein analyzing the images further comprises:
   determining a reference point for a portion of one of the structures appearing in a first image;
   identify the portion of one of the structures in second images that are subsequent to the first image,
   track a movement of the reference point across the first image and the second images; and
   increment, responsive to reference point passing a certain location with respect to the first image and the subsequent images, the number of structures passed by the inventory robot.

5. The method of claim 1, wherein analyzing the images further comprises:
   creating a contour for each region of pixels corresponding to a portion of one of the structures;
   determining a reference point for each contour; and
   performing contour merging based on positions of the reference points of the contours and boundaries of the contours.

6. The method of claim 1, further comprising determining an estimated yaw angle of the inventory robot relative to the one of the structures and an estimated distance between the inventory robot and the one of the structures.

7. The method of claim 1, further comprising:
   responsive to determining that a center offset of the inventory robot is within a threshold distance from the target location, capturing a picture of the target location by the image sensor.

8. The method of claim 1, wherein a start location is a base station configured to charge the inventory robot.

9. The method of claim 1, wherein the inventory robot is an aerial drone.

10. An inventory robot, comprising:
    one or more image sensors configured to capture images of a storage site;
    one or more processors; and
    one or more memories coupled to the one or more processors, the one or more memories storing one or more sets of instructions, the one or more sets of instructions, when executed by the one or more processors, cause the one or more processors to:
       receive a target location in the storage site, the target location defined by a coordinate that specifies a target aisle, a target rack, a row number of the rack, and a column number of the rack;
       control the inventory robot to move to the target location along a path;
       capture images using the one or more image sensors as the inventory robot moves along the path;
       determine, along the path, one or more locations of the inventory robot relative to one or more structures; and
       analyze the images captured by the one or more image sensors to determine a current location of the inventory robot in the path by tracking a number of structures in the storage site passed by the inventory robot, the structures comprising racks with rows and columns, wherein determining the current location of the inventory robot in the path comprises:
          counting a number of racks that the inventory robot has passed based on the rack number,
          turning into an aisle at which the target rack is located,
          counting the number of columns that the inventory robot has passed based on the column number to locate the target location, and
          moving to a row corresponding to the row number.

11. The inventory robot of claim 10, wherein instructions for analyzing the images cause the one or more processors to:
    create image segmentations from the images captured, an image segmentation in one of the images comprises a segment of frames of the structures appearing in the one of the images, and
    identify the structures using the image segmentation in the one of the images.

12. The inventory robot of claim 10, wherein the image sensor comprises a depth camera configured to generate depth data of objects within a field of view of the depth camera.

13. The inventory robot of claim 10, further comprising a visual-inertial odometry (VIO) unit configured to access the images stored in the one or more memories to determine a position and orientation of the inventory robot.

14. The inventory robot of claim 10, wherein the one or more memories further store a total number of the structures in the storage site and dimension information of the structures.

15. The inventory robot of claim 10, wherein a start location is a base station configured to charge the inventory robot.

16. The inventory robot of claim 10, wherein the inventory robot is an aerial drone.

17. A system for managing a storage site, the system comprising:
  an inventory robot comprising one or more processors and one or more memories coupled to the one or more processors, the one or more memories storing one or more sets of instructions, the one or more sets of instructions, when executed by the one or more processors, cause the one or more processors to:
    receive a target location in the storage site, the target location defined by a coordinate that specifies a target aisle, a target rack, a row number of the rack, and a column number of the rack,
    control the inventory robot to move to the target location along a path, comprising:
      counting the number of racks that the inventory robot has passed based on the rack number,
      turning into an aisle at which the target rack is located,
      counting the number of columns that the inventory robot has passed based on the column number to locate the target location, and
      moving to a row corresponding to the row number;
    capture images using one or more image sensors as the inventory robot moves along the path;
    determine, along the path, one or more locations of the inventory robot relative to one or more structures;
    analyze the images captured by the one or more image sensors to determine a current location of the inventory robot in the path by tracking a number of structures in the storage site passed by the inventory robot; and
    capture a picture of the target location; and
  a base station configured to repower the inventory robot, the base station configured to download the picture of the target location responsive to the inventory robot returning to the base station.

18. The system of claim 17, wherein instructions for analyzing the images cause the one or more processors to:
  create image segmentations from the images captured, an image segmentation in one of the images comprises a segment of frames of the structures appearing in the one of the images, and
  identify the structures using the image segmentation in the one of the images.

19. The system of claim 17, wherein the image sensor comprises a depth camera configured to generate depth data of objects within a field of view of the depth camera.

20. The system of claim 17, further comprising a visual-inertial odometry (VIO) unit configured to access the images stored in the one or more memories to determine a position and orientation of the inventory robot.

* * * * *